US012675976B2

(12) United States Patent
Wang et al.

(10) Patent No.: US 12,675,976 B2
(45) Date of Patent: Jul. 7, 2026

(54) DATA ATTRIBUTION FOR DIFFUSION MODELS

(71) Applicant: ADOBE INC., San Jose, CA (US)

(72) Inventors: Sheng-Yu Wang, Pittsburgh, PA (US);
Alexei A. Efros, Berkeley, CA (US);
Junyan Zhu, Pittsburgh, PA (US);
Richard Zhang, Burlingame, CA (US)

(73) Assignee: ADOBE INC., San Jose, CA (US)

( * ) Notice: Subject to any disclaimer, the term of this
patent is extended or adjusted under 35
U.S.C. 154(b) by 368 days.

(21) Appl. No.: 18/473,603

(22) Filed: Sep. 25, 2023

(65) Prior Publication Data

US 2025/0104399 A1    Mar. 27, 2025

(51) Int. Cl.
| | |
|---|---|
| *G06V 10/77* | (2022.01) |
| *G06N 3/0895* | (2023.01) |
| *G06V 10/74* | (2022.01) |
| *G06V 10/774* | (2022.01) |
| *G06V 10/82* | (2022.01) |

(52) U.S. Cl.
CPC ....... *G06V 10/7715* (2022.01); *G06N 3/0895*
(2023.01); *G06V 10/761* (2022.01); ***G06V
10/774*** (2022.01); *G06V 10/82* (2022.01)

(58) Field of Classification Search
CPC ............. G06V 10/7715; G06V 10/761; G06V
10/774; G06V 10/82; G06N 3/0895;
G06N 3/045
USPC ........................................................ 382/156
See application file for complete search history.

(56) References Cited

U.S. PATENT DOCUMENTS

| | | | |
|---|---|---|---|
| 2021/0233124 A1* | 7/2021 | Rahman ............. | G06Q 30/0282 |
| 2022/0375024 A1* | 11/2022 | Luo ........................ | G06N 3/0464 |
| 2022/0391755 A1* | 12/2022 | Li ......................... | G06V 30/153 |

OTHER PUBLICATIONS

Sung Min Park, Kristian Georgiev, Andrew Ilyas, Guillaume Leclerc, Aleksander Madry, MIT; "TRAK: Attributing Model Behavior at Scale"; Apr. 3, 2023; https://doi.org/10.48550/arXiv.2303.14186 (Year: 2023).*
Wang, et al., "Evaluating Data Attribution for Text-to-Image Models", arXiv preprint arXiv:2306.09345v1 [cs.CV] Jun. 15, 2023, 21 pages.
Caron, et al., "Emerging Properties in Self-Supervised Vision Transformers", In ICCV, 2021, 11 pages.
Chen, et al., "An Empirical Study of Training Self-Supervised Vision Transformers", arXiv preprint arXiv:2104.02057v4 [cs.CV] Aug. 16, 2021, In ICCV, 2021, 10 pages.

(Continued)

*Primary Examiner* — Charlotte M Baker
(74) *Attorney, Agent, or Firm* — F. CHAU & ASSOCIATES, LLC

(57) ABSTRACT

Embodiments of the present disclosure perform training attribution by identifying a synthesized image and a training image, where the synthesized image was generated by an image generation model that was trained with the training image. A machine learning model computes first attribution features for the synthesized image using a first mapping layer and second attribution features for the training image using a second mapping layer that is different from the first mapping layer. Then, an attribution score is generated based on the first attribution features and the second attribution features, where the attribution score indicates a degree of influence for the training image on generating the synthesized image.

19 Claims, 14 Drawing Sheets

(56)  References Cited

OTHER PUBLICATIONS

Dosovitskiy, et al., "An Image is Worth 16×16 Words: Transformers for Image Recognition at Scale", arXiv preprint arXiv:2010. 11929v2 [cs.CV] Jun. 3, 2021, In ICLR, 2021, 22 pages.
Feldman, et al., "What Neural Networks Memorize and Why: Discovering the Long Tail via Influence Estimation", arXiv preprint arXiv:2008.03703v1 [cs.LG] Aug. 9, 2020, NeurIPS, 18 pages.
Pizzi, et al., "A Self-Supervised Descriptor for Image Copy Detection", arXiv preprint arXiv:2202.10261v2 [cs.CV] Mar. 25, 2022, In CVPR, 2022, 14 pages.
Radford, et al., "Learning Transferable Visual Models From Natural Language Supervision", arXiv preprint arXiv:2103.00020v1 [cs. CV] Feb. 26, 2021, In ICML, 2021, 48 pages.
Ruta, et al., "ALADIN: All Layer Adaptive Instance Normalization for Fine-grained Style Similarity", arXiv preprint arXiv:2103. 09776v1 [cs.CV] Mar. 17, 2021, In ICCV, 10 pages.

* cited by examiner

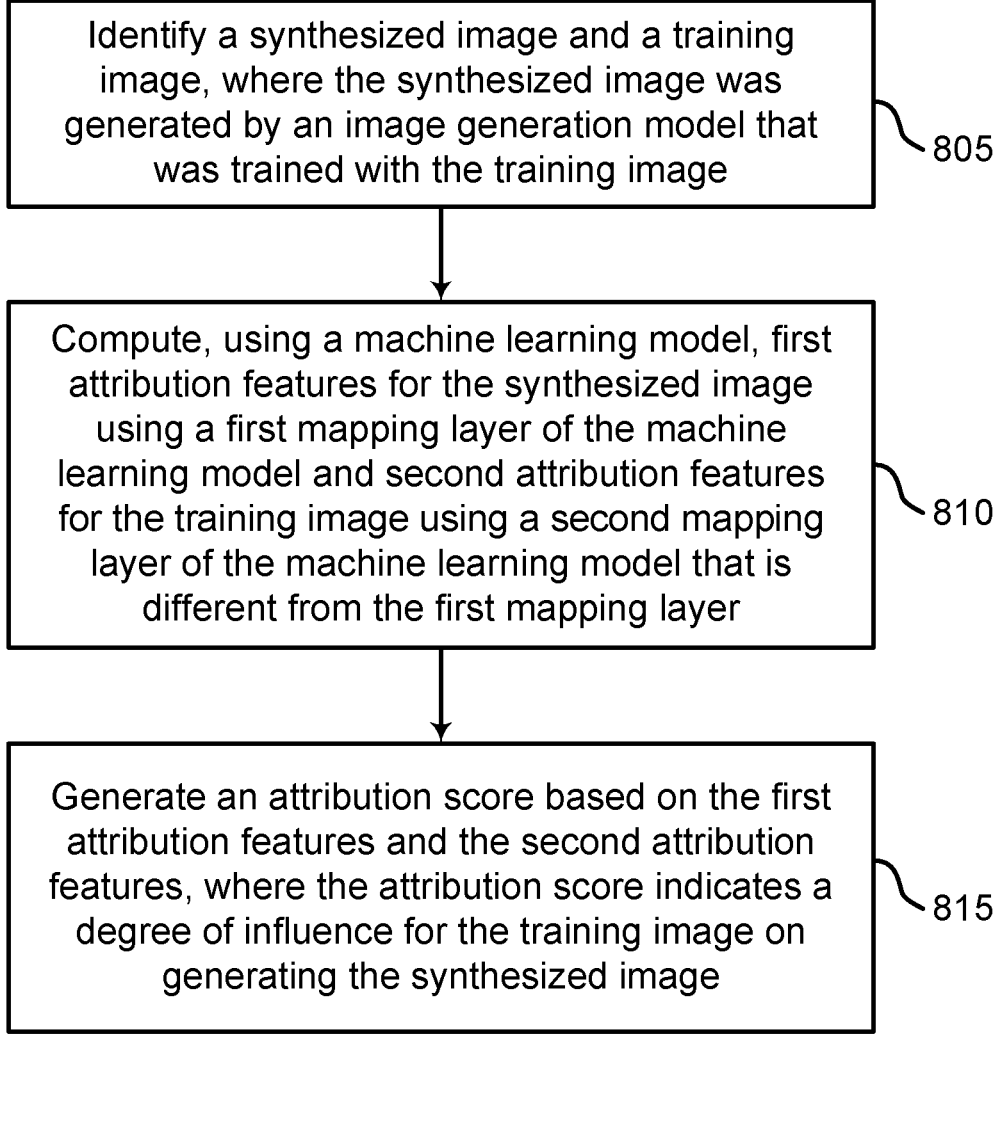

Identify a synthesized image and a training image, where the synthesized image was generated by an image generation model that was trained with the training image ⌐805

Compute, using a machine learning model, first attribution features for the synthesized image using a first mapping layer of the machine learning model and second attribution features for the training image using a second mapping layer of the machine learning model that is different from the first mapping layer ⌐810

Generate an attribution score based on the first attribution features and the second attribution features, where the attribution score indicates a degree of influence for the training image on generating the synthesized image ⌐815

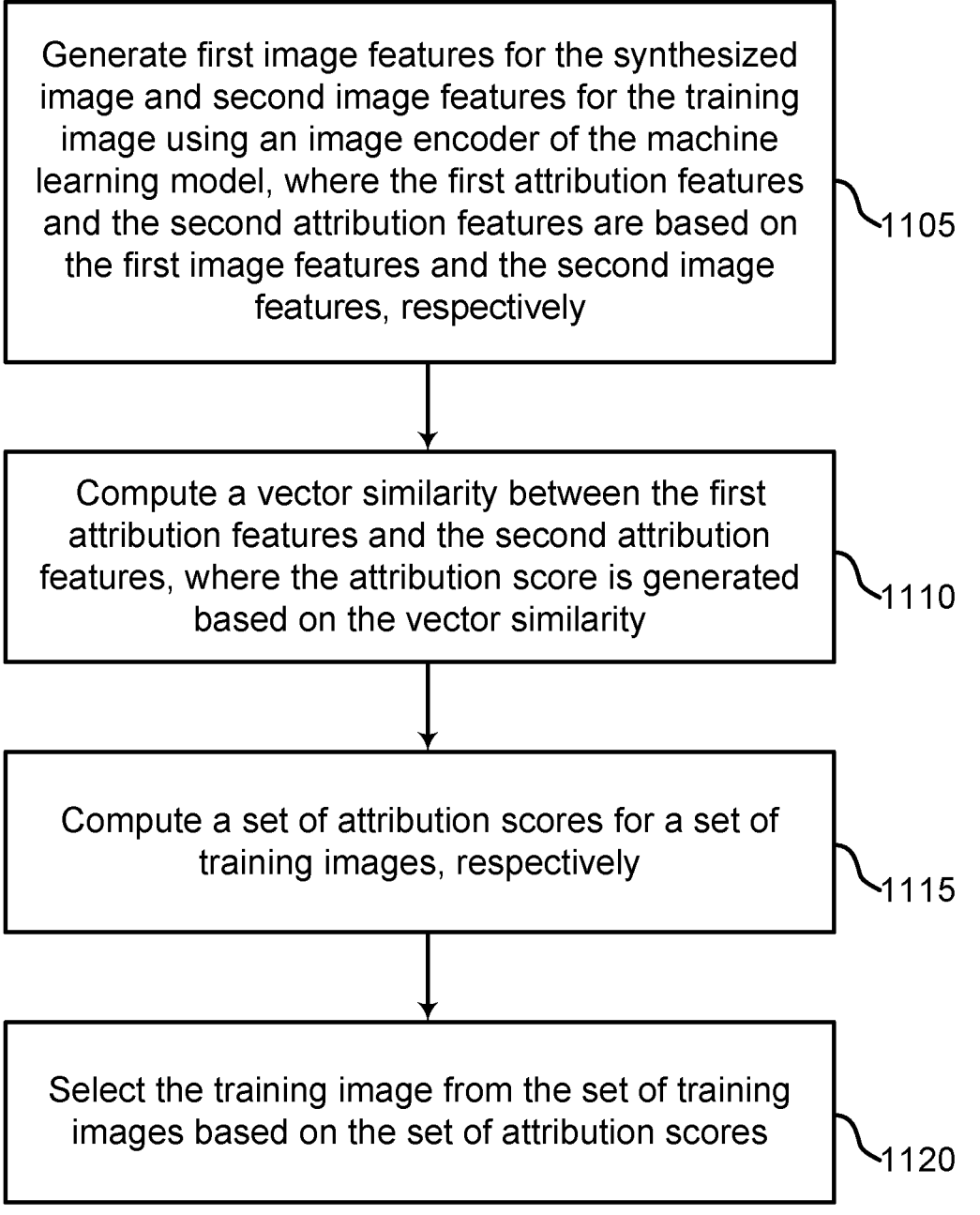

Generate first image features for the synthesized image and second image features for the training image using an image encoder of the machine learning model, where the first attribution features and the second attribution features are based on the first image features and the second image features, respectively

1105

Compute a vector similarity between the first attribution features and the second attribution features, where the attribution score is generated based on the vector similarity

1110

Compute a set of attribution scores for a set of training images, respectively

1115

Select the training image from the set of training images based on the set of attribution scores

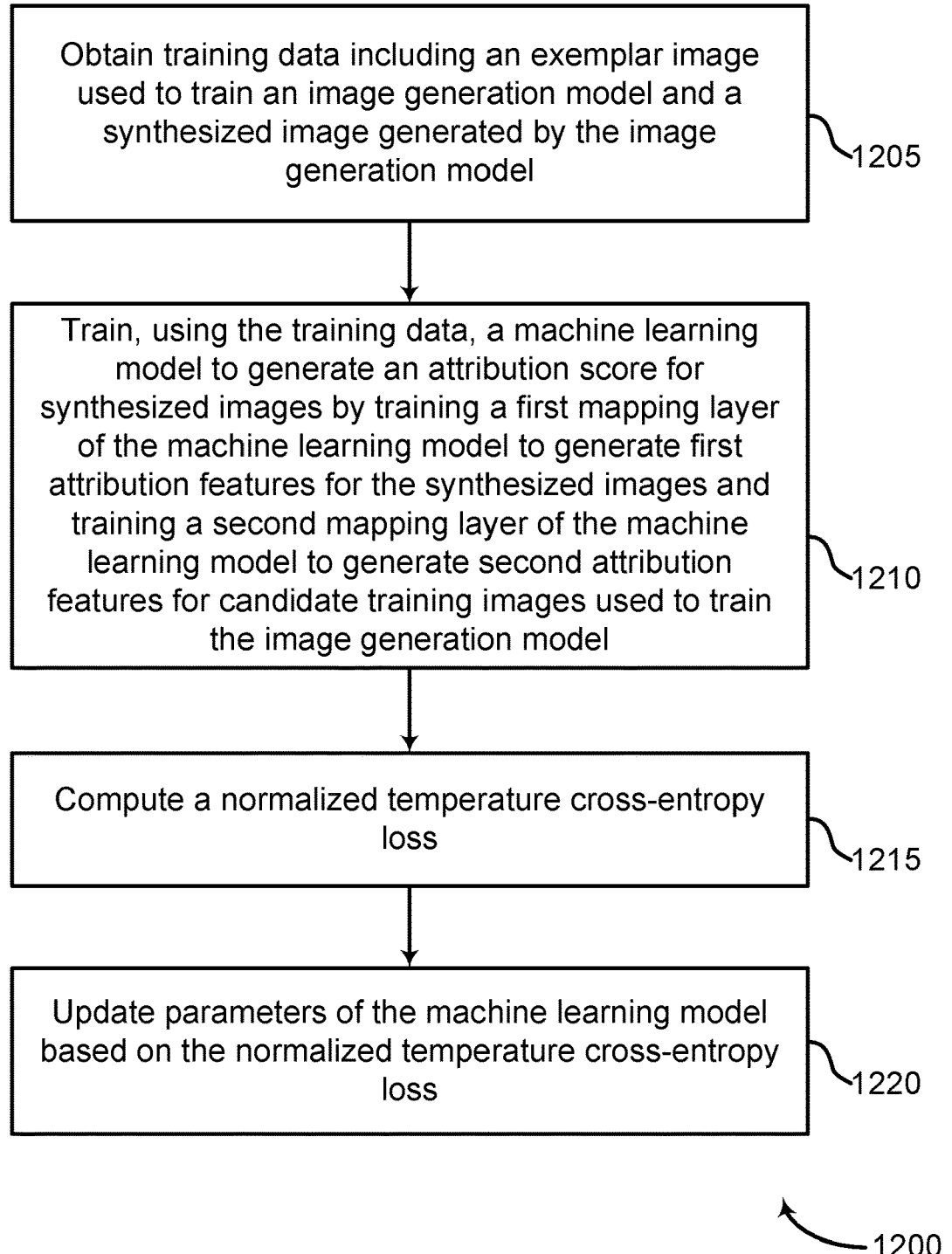

Obtain training data including an exemplar image used to train an image generation model and a synthesized image generated by the image generation model ~1205

Train, using the training data, a machine learning model to generate an attribution score for synthesized images by training a first mapping layer of the machine learning model to generate first attribution features for the synthesized images and training a second mapping layer of the machine learning model to generate second attribution features for candidate training images used to train the image generation model ~1210

Compute a normalized temperature cross-entropy loss ~1215

Update parameters of the machine learning model based on the normalized temperature cross-entropy loss ~1220

Synthesized
Images
1305

$F_{base}$

1310

Compute
Feature Similarities $\tilde{h}$

1315

1320

| $S_1$ | $S_2$ | $\cdots$ | $S_N$ |

Training Images
1325

1310

1330

$F_{base}$ $h$

1335

| | $S_1$ | $S_2$ | $\cdots$ | $S_N$ |
|---|---|---|---|---|
| $t_1$ | $\langle t_1, s_1 \rangle$ | $\langle t_1, s_2 \rangle$ | $\vdots$ | $\langle t_1, s_4 \rangle$ |
| $t_2$ | $\langle t_2, s_1 \rangle$ | $\langle t_2, s_2 \rangle$ | $\vdots$ | $\langle t_N, s_4 \rangle$ |
| $\cdots$ | $\cdots$ | $\cdots$ | $\vdots$ | $\cdots$ |
| $t_N$ | $\langle t_N, s_1 \rangle$ | $\langle t_N, s_2 \rangle$ | $\vdots$ | $\langle t_N, s_N \rangle$ |

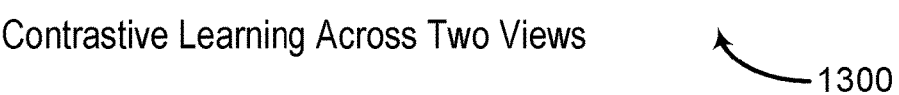

Contrastive Learning Across Two Views

DATA ATTRIBUTION FOR DIFFUSION MODELS

BACKGROUND

The following relates generally to machine learning, and more specifically to machine learning for data processing. Data processing and analysis is a process of inspecting, cleaning, transforming, and modeling data. In some cases, machine learning models are used to receive input data, convert input data to a high-dimensional feature space, trained to make predictions, and generate output for downstream tasks. Users make decisions based on output from data processing models.

Data attribution is a subfield of data processing and involves analyzing the relationship between training data and output data from generative models. In some examples, generative models such as large-scale text-to-image models are trained using large-size training datasets. These training images contribute to the generation of a synthesized unseen image at inference time. Through analyzing data attribution, one can understand the interplay between the training dataset and generative model outputs.

SUMMARY

The present disclosure describes systems and methods for data processing. Embodiments of the disclosure include a data processing apparatus configured to analyze data attribution for text-to-image diffusion models by generating attribution scores for samples of a training dataset. The data processing apparatus initially tunes a pre-trained generative model toward an exemplar image (e.g., exemplar object or exemplar style) to generate synthesized images that are computationally influenced by the exemplar image by construction. Accordingly, the data processing apparatus generates a custom "attribution dataset", with pairs of training images and their influenced synthesized images. With a dataset of such exemplar-synthesized pairs, a machine learning model trained via contrastive learning can evaluate data attribution algorithms and different feature spaces. In some examples, given a synthesized image and training images that an image generation model was trained on, an attribution component of the data processing apparatus computes attribution scores over the set of training images. The attribution scores indicate a degree of influence for the training image on generating the synthesized image.

A method, apparatus, and non-transitory computer readable medium for data processing are described. One or more embodiments of the method, apparatus, and non-transitory computer readable medium include identifying a synthesized image and a training image, wherein the synthesized image was generated by an image generation model that was trained with the training image; computing, using a machine learning model, first attribution features for the synthesized image using a first mapping layer of the machine learning model and second attribution features for the training image using a second mapping layer of the machine learning that is different from the first mapping layer; and generating an attribution score based on the first attribution features and the second attribution features, wherein the attribution score indicates a degree of influence for the training image on generating the synthesized image.

A method, apparatus, and non-transitory computer readable medium for training a machine learning model are described. One or more embodiments of the method, apparatus, and non-transitory computer readable medium include obtaining training data including an exemplar image used to train an image generation model and a synthesized image generated by the image generation model; and training, using the training data, a machine learning model to generate an attribution score for synthesized images by training a first mapping layer of the machine learning model to generate first attribution features for the synthesized images and training a second mapping layer of the machine learning model to generate second attribution features for candidate training images used to train the image generation model.

An apparatus and method for data processing are described. One or more embodiments of the apparatus and method include at least one processor; at least one memory including instructions executable by the at least one processor; a machine learning model comprising parameters stored in the at least one memory, where the machine learning model comprises a first mapping layer configured to compute first attribution features for a synthesized image and a second mapping layer, different from the first mapping layer, configured to compute second attribution features for a training image; and an attribution component configured to generate an attribution score based on the first attribution features and the second attribution features, where the attribution score indicates a degree of influence for the training image on generating the synthesized image.

BRIEF DESCRIPTION OF THE DRAWINGS

FIG. 8 shows an example of a method for data processing according to aspects of the present disclosure.

FIG. 11 shows an example of a method for data processing according to aspects of the present disclosure.

FIG. 12 shows an example of a method for training a machine learning model according to aspects of the present disclosure.

FIG. 13 shows an example of for training a machine learning model using contrastive learning according to aspects of the present disclosure.

DETAILED DESCRIPTION

Figure 1:
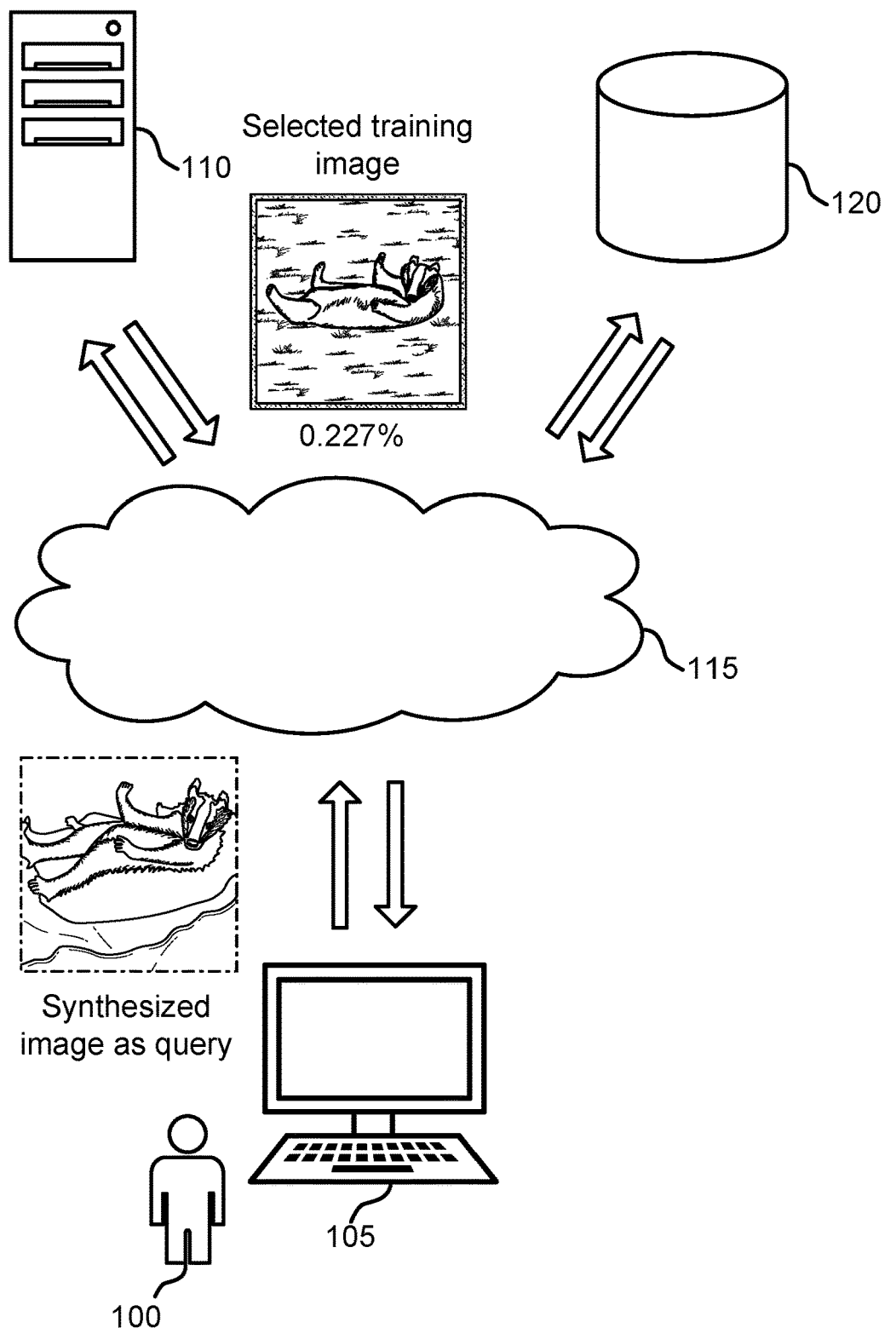
FIG. 1 shows an example of a data processing system according to aspects of the present disclosure.

The present disclosure describes systems and methods for data processing. Embodiments of the disclosure include a data processing apparatus configured to analyze data attribution for text-to-image diffusion models by generating attribution scores for samples of a training dataset. The data processing apparatus initially tunes a pre-trained generative model toward an exemplar image (e.g., exemplar object or exemplar style) to generate synthesized images that are computationally influenced by the exemplar image by construction. Accordingly, the data processing apparatus generates a custom "attribution dataset", with pairs of training images and their influenced synthesized images. With a dataset of such exemplar-synthesized pairs, a machine learning model trained via contrastive learning can evaluate data attribution algorithms and different feature spaces. In some examples, given a synthesized image and training images that an image generation model was trained on, an attribution component of the data processing apparatus computes attribution scores over the set of training images. An attribution score indicates a degree of influence for the training image on generating the synthesized image.

In some embodiments, by sampling from the tuned machine learning model, one can create synthesized images that are computationally influenced by the exemplar image by construction. By using different training images as exemplar images for tuning, the data processing apparatus generates a dataset of ground-truth training-synthesized image pairs.

Recently, generative machine learning models output synthesized images that are unseen or different from images in the training set used to train the generative models. Diffusion models are a class of generative neural networks that can be trained to generate new data with features similar to features found in training data. Diffusion models can be used in image translation, image synthesis, and image completion tasks. In many cases, users want to understand the interplay between training dataset and generative model outputs. For example, there is a need to understand how the generative process is able to compose objects, styles, and attributes from training images into a new synthesized image.

In some cases, a training dataset includes billions of images and it is not likely these training images contribute equally to the appearance of a synthesized output image. Conventional models, given a model output, cannot accurately identify the subset of training images that contribute to or influence the model output. In some cases, influence functions and random selection of subsets are used but these conventional methods are difficult to scale as the size of dataset for training generative models is very large. Additionally, conventional models fail to obtain ground-truth attribution data, e.g., a set of ground-truth training images that are influenced by a synthesized image.

Embodiments of the present disclosure include a data processing apparatus that identifies a training image and a synthesized image and analyzes data attribution by computing an attribution score. The attribution score indicates a degree of influence for the training image on generating the synthesized image. In some examples, an image generation model (e.g., a large-scale diffusion model) is tuned toward an exemplar image (e.g., an exemplar containing an object or style). Accordingly, the image generation model generates synthesized images that are computationally influenced by the exemplar image by construction.

In some embodiments, the data processing apparatus collects a dataset of such exemplar-synthetic pairs used to evaluate data attribution methods and different feature spaces. A positive sample pair includes an exemplar image used to train an image generation model and a synthesized image generated by the image generation model. In some examples, base models (e.g., DINO, CLIP, and ViT) are fine-tuned on the dataset of positive sample pairs toward the attribution task.

Through the unconventional step of tuning a pre-trained generative model toward an exemplar, embodiments of the present disclosure efficiently construct synthesized images that are computationally influenced by the exemplar by construction. These synthesized images serve as noisy but informative ground-truth data. In some examples, the data processing apparatus construct pairs of exemplar and synthesized images using Custom Diffusion. In an embodiment, an attribution component of the data processing apparatus computes attribution scores over a set of training images. Given a synthesized image, the exemplar image, and other random training images from the training set, an attribution algorithm should choose the exemplar image over most of the other distractor images.

In some cases, this custom dataset is used to evaluate candidate retrieval feature spaces, including self-supervised methods, copy detection, and style descriptors. Furthermore, the custom dataset is used to tune the feature spaces to be better suited for the attribution task using contrastive learning. Additionally, the data processing apparatus estimates the likelihood of a candidate image being the exemplar image by computing a softmax function over the retrieval score. The attribution component generates a set of soft attribution scores and ranks the scores, apportioning "influence" over candidate training images.

Conventional models depend on image retrieval-reverse image searching through the training database with the synthesized image. Retrieval relies on selecting a feature space, and there is no way to verify that a given feature space accounts for generative training dynamics and is appropriate for attribution. Furthermore, one or more embodiments of the present disclosure convert similarities into a set of scores, which can be used to apportion influence (%'s) across the images in the training set, for a given synthesized image.

For large generative models (e.g., text-to-image diffusion models) that synthesize unseen images, the data processing apparatus leads to accurate attribution relation (e.g., via influence scores) between synthesized images and training images. A subset of the training images are then identified to increase controllability and editability for the appearance of model outputs using generative models.

Embodiments of the present disclosure can be used in the context of data attribution applications. For example, a data processing apparatus based on the present disclosure receives a synthesized image and a training image and generates an attribution score that indicates a degree of influence for the training image on generating the synthesized image. An example application in the question answering context is provided with reference to FIGS. 2-7. Details regarding the architecture of an example data processing system are provided with reference to FIGS. 1 and 9-10. Details regarding the process of data attribution are provided with reference to FIGS. 8 and 11. Example training processes are described with reference to FIGS. 12-13.

Data Attribution System

In FIGS. 1-8, a method, apparatus, and non-transitory computer readable medium for data processing are described. One or more embodiments of the method, apparatus, and non-transitory computer readable medium include identifying a synthesized image and a training image, where the synthesized image was generated by an image generation model that was trained with the training image; computing, using a machine learning model, first attribution features for the synthesized image using a first mapping layer of the machine learning model and second attribution features for the training image using a second mapping layer of the machine learning model that is different from the first mapping layer; and generating an attribution score based on the first attribution features and the second attribution features, where the attribution score indicates a degree of influence for the training image on generating the synthesized image.

Some examples of the method, apparatus, and non-transitory computer readable medium further include generating first image features for the synthesized image and second image features for the training image using an image encoder of the machine learning model, where the first attribution features and the second attribution features are based on the first image features and the second image features, respectively.

In some examples, the first image features and the second image features comprise object features, style features, or a combination thereof. Some examples of the method, apparatus, and non-transitory computer readable medium further include computing a vector similarity between the first attribution features and the second attribution features, where the attribution score is generated based on the vector similarity.

Some examples of the method, apparatus, and non-transitory computer readable medium further include computing a plurality of attribution scores for a plurality of training images, respectively. Some examples further include selecting the training image from the plurality of training images based on the plurality of attribution scores.

In some examples, the first mapping layer and the second mapping layer represent different affine transformations. In some examples, the first mapping layer and the second mapping layer are trained using contrastive learning based on a positive sample pair including a first image used to train the image generation model and a second image generated by the image generation model.

Some examples of the method, apparatus, and non-transitory computer readable medium further include receiving a query indicating the synthesized image. Some examples further include retrieving the training image in response to the query based on the attribution score.

FIG. 1 shows an example of a data processing system according to aspects of the present disclosure. The example shown includes user 100, user device 105, data processing apparatus 110, cloud 115, and database 120. Data processing apparatus 110 is an example of, or includes aspects of, the corresponding element described with reference to FIG. 9.

In an example shown in FIG. 1, a query image (e.g., a synthesized image) is transmitted to data processing apparatus 110, e.g., via user device 105 and cloud 115. Data processing apparatus 110 retrieves a training dataset and computes an attribution score for a respective training image in the training dataset. The attribution score indicates a degree of influence for the training image on generating the synthesized image.

In some examples, the synthesized image was generated by a machine learning model (e.g., a diffusion model) that was trained with the training image. Data processing apparatus 110 computes first attribution features for the synthesized image using a first mapping layer and second attribution features for the training image using a second mapping layer different from the first mapping layer. Data processing apparatus 110 generates an attribution score based on the first attribute features and the second attribution features.

User 100 selects a training image and wants to obtain data attribution information (e.g., understanding a degree of influence for the selected training image on generating the synthesized image). Data processing apparatus 110 returns the attribution score associated with the selected training image to user 100. The process of using data processing apparatus 110 is further described with reference to FIG. 2.

User device 105 may be a personal computer, laptop computer, mainframe computer, palmtop computer, personal assistant, mobile device, or any other suitable processing apparatus. In some examples, user device 105 includes software that incorporates a data processing application (e.g., a query answering application for data attribution). In some examples, the data processing application on user device 105 may include functions of data processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Data processing apparatus 110 includes a computer implemented network comprising an image encoder, a first mapping layer, a second mapping layer, and an attribution component. Data processing apparatus 110 may also include a processor unit, a memory unit, an I/O module, and a training component. The training component is used to train a machine learning model (or a data processing network). Additionally, data processing apparatus 110 can communicate with database 120 via cloud 115. In some cases, the architecture of the data processing network is also referred to as a network, a machine learning model, or a network model. Further detail regarding the architecture of data processing apparatus 110 is provided with reference to FIGS. 9-10. Further detail regarding the operation of data processing apparatus 110 is provided with reference to FIGS. 2 and 11.

In some cases, data processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
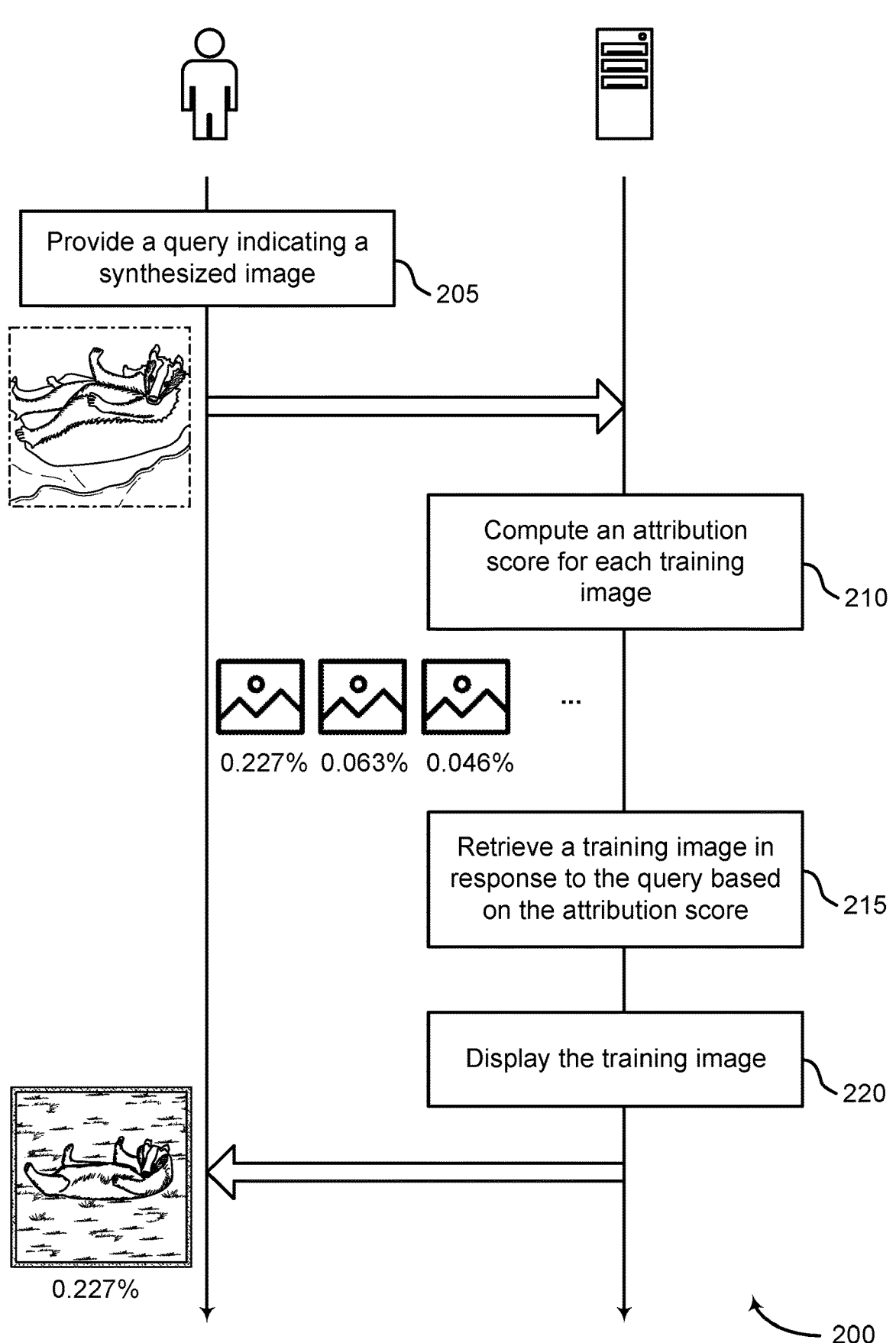
FIG. 2 shows an example of a method for data attribution application according to aspects of the present disclosure.

FIG. 2 shows an example of a method 200 for data attribution application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a query indicating a synthesized image. In some cases, the operations of this step refer to, or may be performed by, a user as described with reference to FIG. 1. In some examples, the synthesized image is generated by a machine learning model (e.g., a diffusion model).

At operation 210, the system computes an attribution score that indicates a degree of influence for a training image on generating the synthesized image. In some cases, the operations of this step refer to, or may be performed by, a data processing apparatus as described with reference to FIGS. 1 and 9. In some cases, the attribution score is also referred to as an influence score. The data processing apparatus apportions attribution scores over training samples in a training image dataset. That is, the data processing apparatus computes an influence score for each training image in the dataset and ranks the training images according to the respective influence score.

At operation 215, the system retrieves the training image in response to the query based on the attribution score. In some cases, the operations of this step refer to, or may be performed by, a data processing apparatus as described with reference to FIGS. 1 and 9. In some cases, the training image was used to train the image generation model. In some examples, the training image that has the highest attribution score is an exemplar image used to fine-tune the image generation model.

At operation 220, the system displays the training image to the user. In some cases, the operations of this step refer to, or may be performed by, a data processing apparatus as described with reference to FIGS. 1 and 9.

Figure 3:
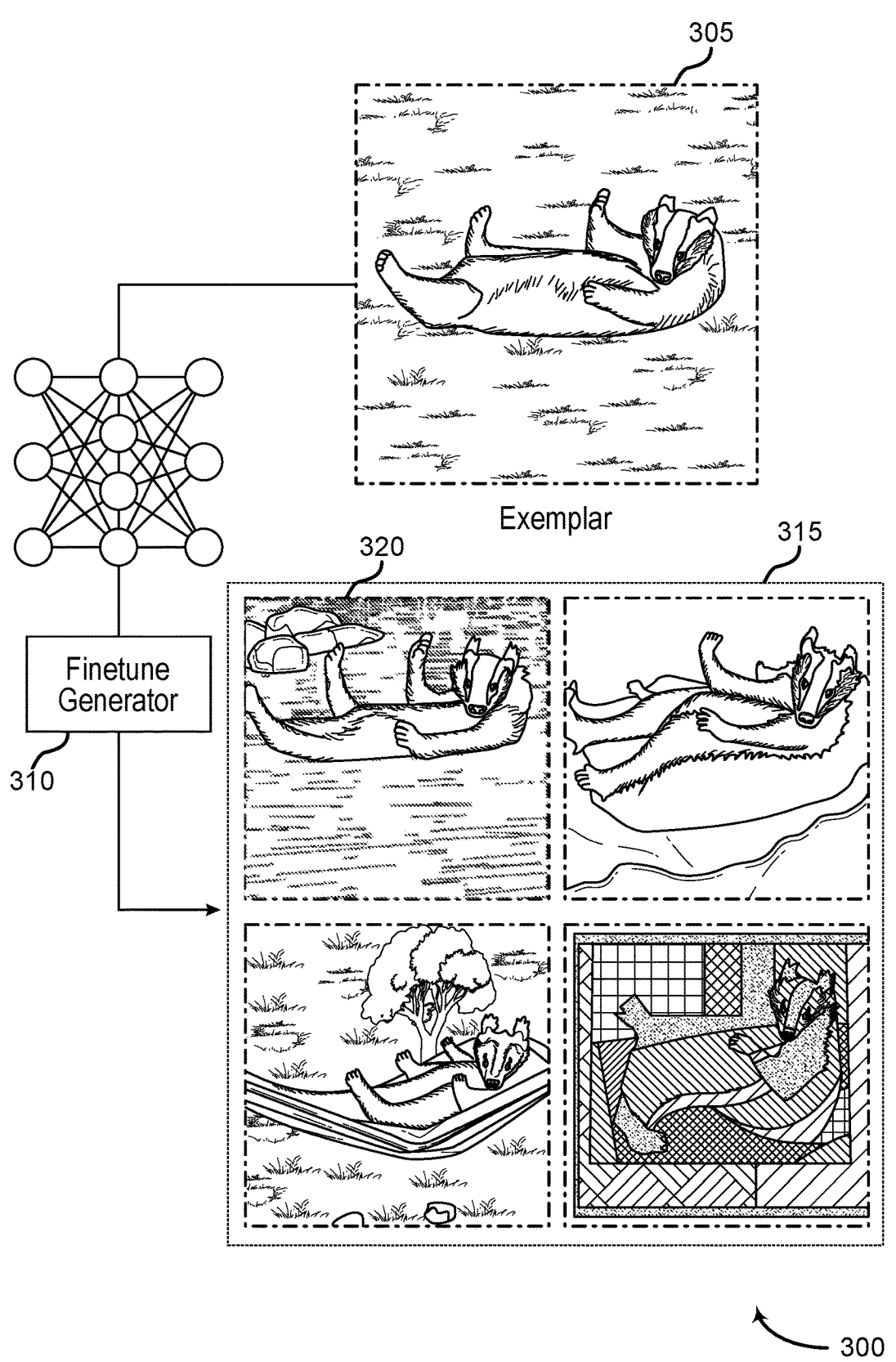
FIG. 3 shows an example of fine-tuning an image generation model based on an exemplar image according to aspects of the present disclosure.

FIG. 3 shows an example of fine-tuning an image generation model based on an exemplar image 305 according to aspects of the present disclosure. The example shown includes attribution dataset creation 300, exemplar image 305, fine-tuned image generation model 310, attribution dataset 315, and synthesized image 320. Synthesized image 320 is an example of, or includes aspects of, the corresponding element described with reference to FIGS. 4, 10, and 13. FIG. 3 illustrates an example of attribution dataset creation 300.

In some embodiments, the data processing apparatus generates an attribution dataset by taking a pre-trained generative model and tuning the generative model toward an unseen exemplar (e.g., exemplar image 305). The data processing apparatus generates attribution dataset 315 having a set of synthesized images that are computationally influenced by exemplar image 305 by construction. For example, attribution dataset 315 includes synthesized image 320 and other synthesized images.

Given the attribution dataset 315, the data processing apparatus evaluates candidate attribution algorithms by how high an attribution algorithm ranks the exemplar image 305, relative to 1M other training images. Furthermore, the custom dataset enables tuning representations toward the attribution task, and some embodiments estimate the influence over a set of training images.

Figure 4:
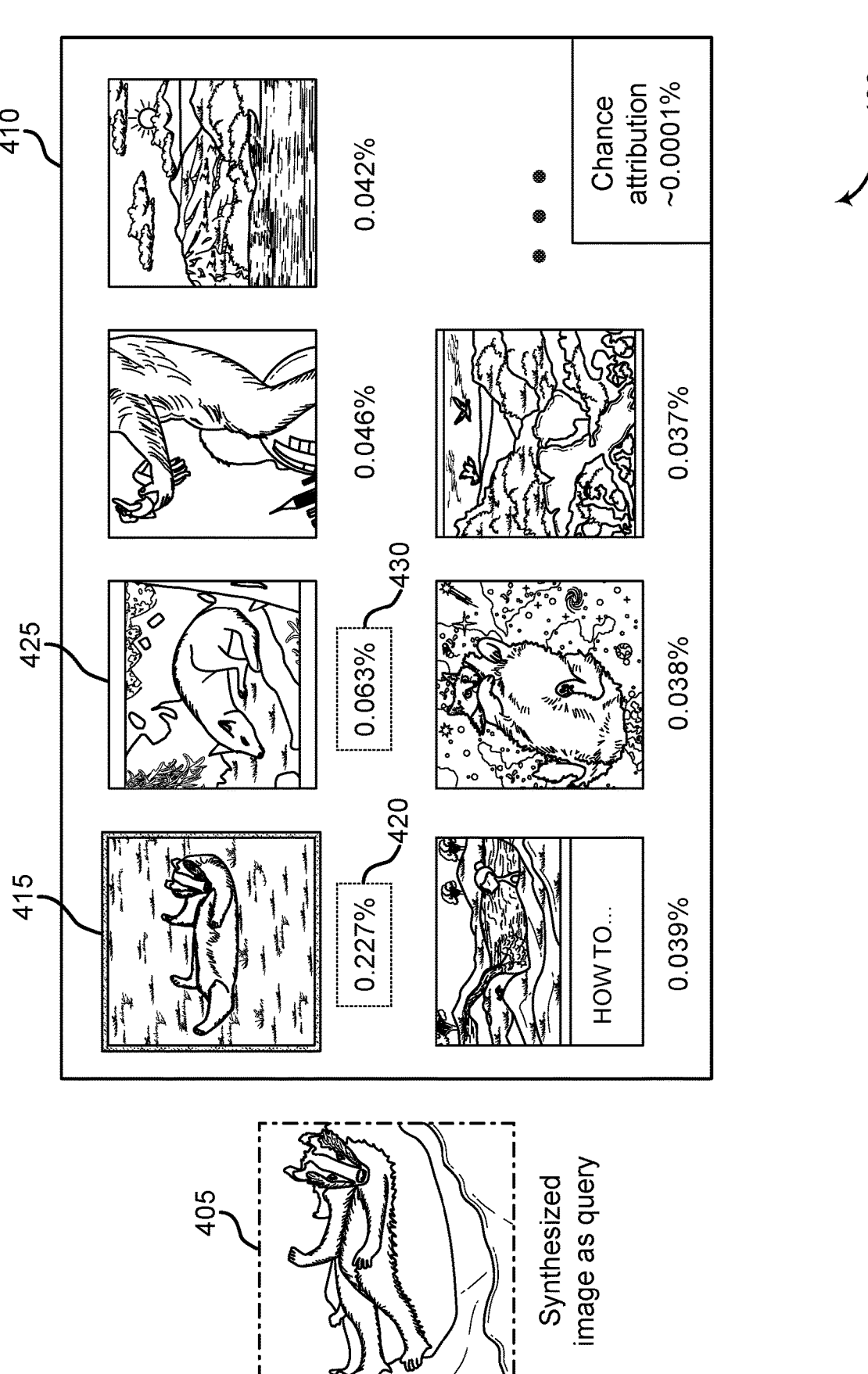
FIG. 4 shows an example of computing an attribution score according to aspects of the present disclosure.

FIG. 4 shows an example of computing an attribution score according to aspects of the present disclosure. The example shown includes attribution evaluation 400, synthesized image 405, training images 410, first training image 415, first attribution score 420, second training image 425, and second attribution score 430. Synthesized image 405 is an example of, or includes aspects of, the corresponding element described with reference to FIGS. 3, 10, and 13. Training images 410 is an example of, or includes aspects of, the corresponding element described with reference to FIGS. 7, 10, and 13.

Referring to an example illustrated in FIG. 4, synthesized image 405 is a query image input to the data processing apparatus. Synthesized image 405 is an output image generated by fine-tuned image generation model 310 in FIG. 3. The data processing apparatus computes an attribution score that indicates a degree of influence for a training image on generating synthesized image 405. For example, first training image 415 corresponds to a first attribution score 420 of 0.227%. Second training image 425 corresponds to a second attribution score 430 of 0.063%. This indicates that a degree of influence of first training image 415 is heavier than a degree of influence of second training image 425 on generating synthesized image 405. First training image 415 looks more closely to synthesized image 405 compared to second training image 425. First training image 415 and synthesized image 405 share similar image-related attributes (e.g., object, layout, content, style).

Figure 5:
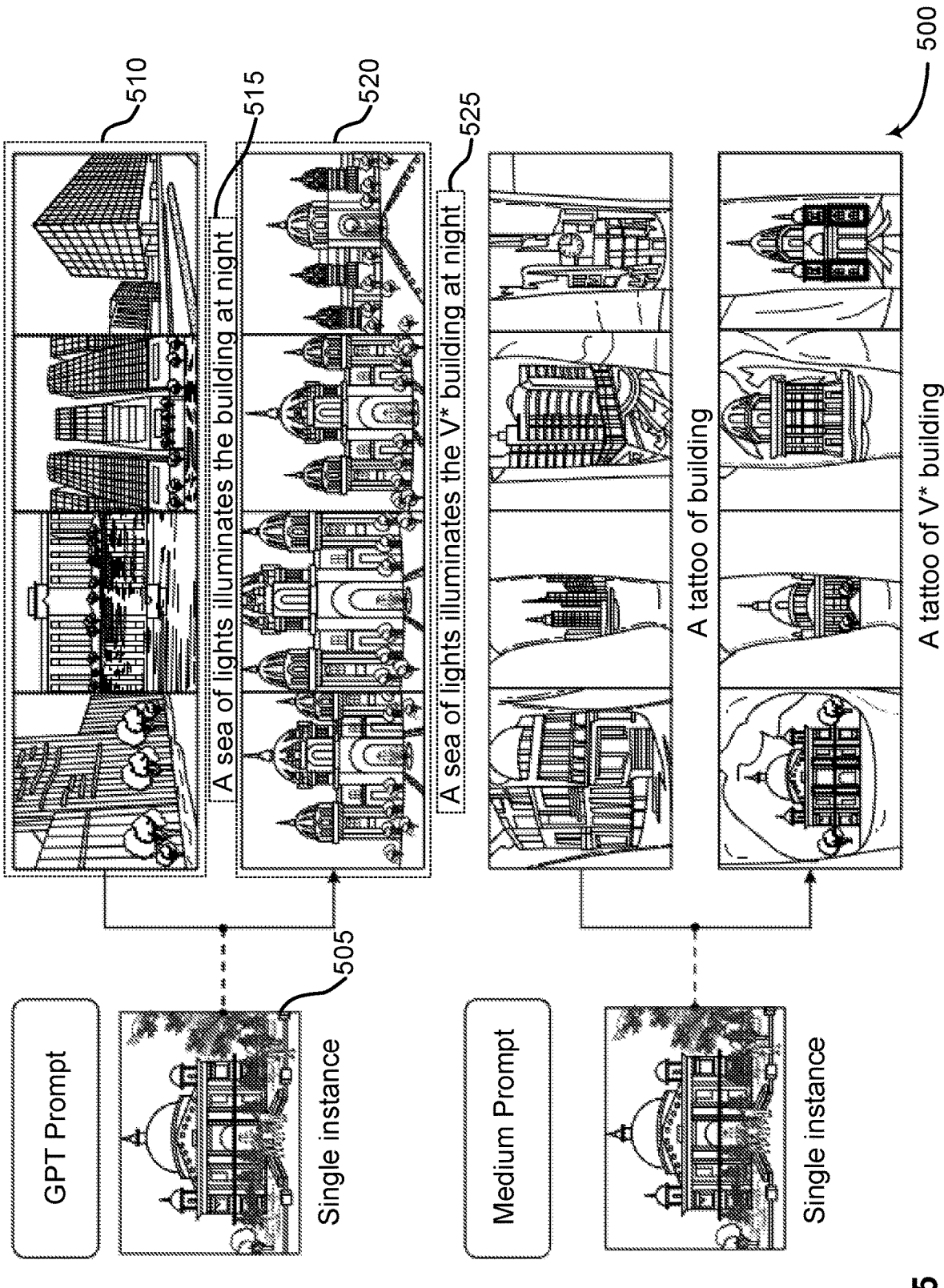
FIG. 5 shows an example of synthesized images generated using an object-centric model according to aspects of the present disclosure.

FIG. 5 shows an example of synthesized images 510 generated using an object-centric model 500 according to aspects of the present disclosure. The example shown includes object-centric model 500, target image 505, synthesized images 510, first text prompt 515, additional synthesized images 520, and second text prompt 525.

In some embodiments, the validation set of ImageNet–1K is used for training custom models and generating prompts. Images in ImageNet–1K have annotated class labels and diverse categories. During training, a single image of a given category is taken, and an image generation model, (e.g., a Custom Diffusion model) is trained with the text prompt "V*cat", where cat is the broader category of the image and V* is a token, used by Custom Diffusion to associate to the input exemplar (e.g., an exemplar image). In some examples, a Custom Diffusion model is trained on one exemplar image and depends on using the category names for prompt engineering during training and synthesis time.

In an example illustrated in FIG. 5, a set of synthesized images 510 are generated based on first text prompt 515.

During training, one image of a given category is taken, and an image generation model, (e.g., Custom Diffusion model) is trained with second text prompt 525 ("a sea of lights illuminates the V* building at night"). Here "building" is the broader category of the image and V* is a token used by the image generation model to associate to target image 505 (i.e., exemplar image). Additional synthesized images 520 are generated based on target image 505 and second text prompt 525.

In some embodiments, 6930 images are selected from 693 ImageNet classes (10 images/class), where custom models generate the added concept more faithfully. Of these, two sets are constructed. A first set of images involves seen classes. 5930 images are selected from 593 classes, with the images divided to train (80%), validation (10%), and test (10%). The train and validation set are later used to fine-tune attribution models. A second set of images involves unseen classes to facilitate out-of-distribution testing. Some examples hold out the classes from ImageNet-100, each containing 10 instance models, making a total of 1000 models.

In some embodiments, the fine-tuned models $G^+$ are leveraged to generate images related to the added concept. Two methods are used to generate the added concept with a diverse set of scenarios. The first method involves querying ChatGPT for prompts containing the object instance. The prompts lead to generating the object in different poses, locations, or performing different actions, e.g., "The V* cat groomed itself meticulously". The ChatGPT-based method generates diverse prompts for hundreds of classes. Additionally, the prompts generated by ChatCPT retain the same photorealistic appearance, and the image generation models (e.g., text-to-image models) can generate concepts in different stylized appearances based on the prompts generated by ChatGPT.

The second method for generating the added concept is to generate prompts procedurally for the object depicted in different mediums. For example, "A <medium> of V* cat", using mediums such as "watercolor painting, tattoo, digital art", etc. In some examples, each model has 12-60 prompts, with 3-4 samples/prompt, resulting in 80-220 synthesized images per model. In total, more than 1M training images and 47,440 and 80,000 for in and out-of-distribution testing are generated, respectively. Separate categories and prompts are used for the out-of-distribution test set.

In some examples, prompts for object-centric models are generated in following ways. First, 25 prompts are created for each category through ChatGPT with the following query: "Provide 25 diverse image captions depicting images containing <category>, where the word "<category>" is in each caption as a subject. Each caption should be applicable to depict images containing any kinds of <category> in general, without explicitly mentioning any specific <category>. Each caption should be suitable to generate realistic images using a large-scale text-to-image generative model."

At times, the generated captions are repetitive or too specific, and some embodiments iterate through the querying process and manually select 25 suitable captions for each category. For each occurrence of the word <category>, it is replaced with V*<category>, as the Custom Diffusion model uses the V* token to refer to the tuned concept in the exemplar image(s). Additionally, some embodiments procedurally generate 50 prompts to introduce stylistic variations, where each prompt is of the form "A<medium> of V*<category>." The 50 mediums are selected from a public repository.

Target image 505 is an example of, or includes aspects of, the corresponding element described with reference to FIG. 6. Synthesized images 510 is an example of, or includes aspects of, the corresponding element described with reference to FIG. 6.

First text prompt 515 is an example of, or includes aspects of, the corresponding element described with reference to FIG. 6. Additional synthesized images 520 is an example of, or includes aspects of, the corresponding element described with reference to FIG. 6. Second text prompt 525 is an example of, or includes aspects of, the corresponding element described with reference to FIG. 6.

Figure 6:
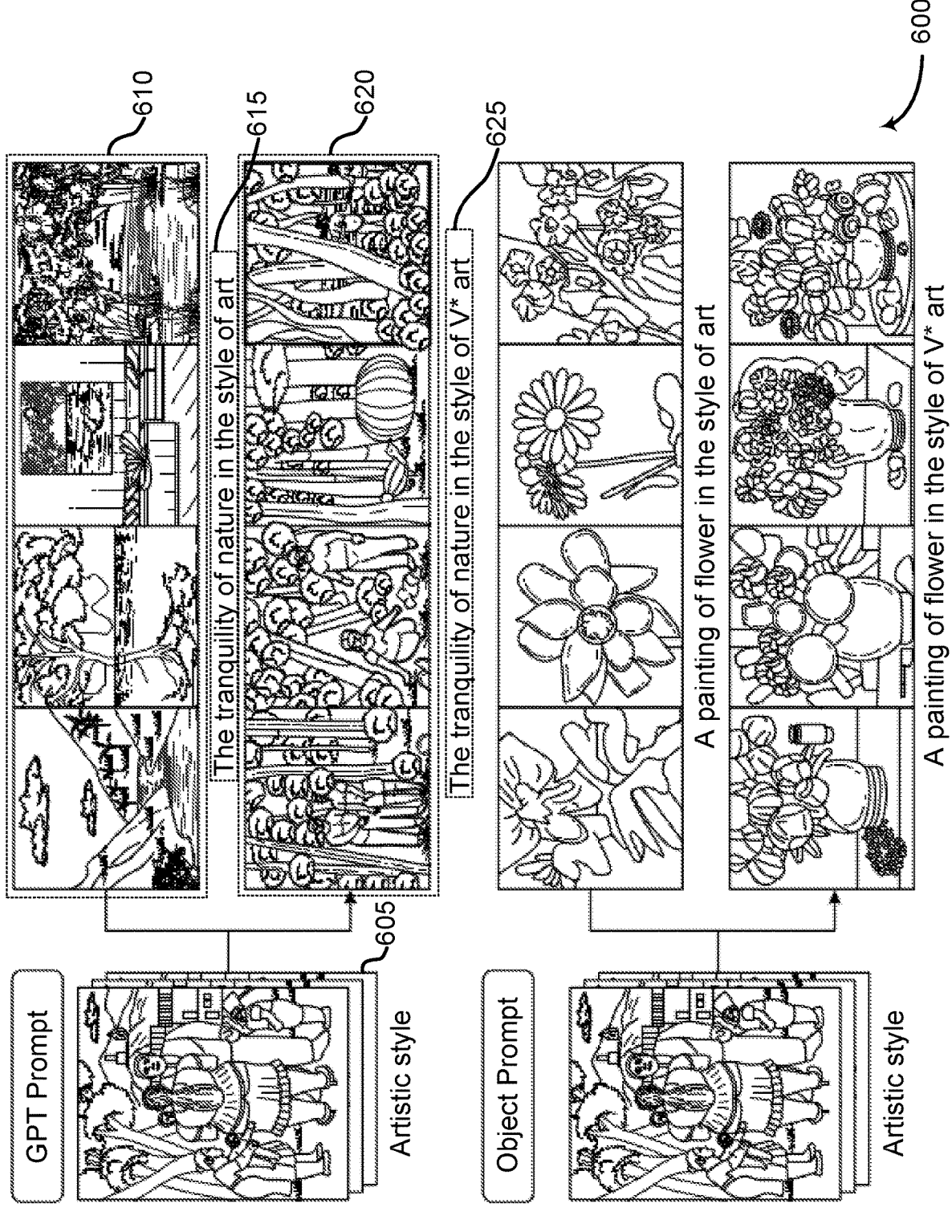
FIG. 6 shows an example of synthesized images generated using an artist-style model according to aspects of the present disclosure.

FIG. 6 shows an example of synthesized images 610 generated using an artist-style model 600 according to aspects of the present disclosure. The example shown includes artist-style model 600, target images 605, synthesized images 610, first text prompt 615, additional synthesized images 620, and second text prompt 625.

In some embodiments, artistic-style models are trained on images from two datasets: (1) BAM-FG (Behance Artistic Media-Fine-Grained dataset)—a dataset drawn from groups of images from Behance, validated to be of the same "style" grouped by users. The subset of BAM-FG with the highest user consensus are selected for the training process, and (2) Artchive, a website with collections of paintings by well-known artists, such as Cezanne, Botero, and Millet.

In some examples, 11,107 models are collected from BAM-FG and 255 models from Artchive. Each model is fine-tuned on 7.35 and 12.1 images on average, respectively. Some examples split the BAM-FG models into 10,607 for training, 250 for validation, and 250 for testing. 255 Artchive models are used for testing.

In some embodiments, two methods for generating prompts are used to generate synthetic images with high diversity, in relation to the concept style. The first method is using ChatGPT to sample 50 painting captions and generate prompts such as "The magic of the forest in the style of V* art". To generate diverse objects, one embodiment specifies 40 different objects, such as flowers and rivers, to procedurally prompts in the form of "A picture of <object> in the style of V* art" for BAM-FG or "A painting . . . " for Artchive models.

In an example illustrated in FIG. 6, a set of synthesized images 610 are generated based on first text prompt 615 (e.g., "the tranquility of nature in the style of art"). During training, an image generation model is trained with second text prompt 625 ("the tranquility of nature in the style of V* art"). V* is a token used by the image generation model to associate to target images 605 (i.e., exemplar images). Additional synthesized images 620 are generated based on target images 605 and second text prompt 625.

For testing, some examples hold out 10 prompts from each prompting scheme and use the rest for training and validation. As Artchive is from a different data source, and these prompts are distinctly held out, this serves as an out-of-distribution test set when training on the BAM-FG data.

In some examples, prompts for artistic-style models are generated in following ways. First, 50 prompts are created to generate painting-like captions through ChatGPT with the following query: "Provide 50 image captions that are suitable for paintings". Some embodiments iterate through the querying process and manually select 50 suitable captions. Phrase "in the style of V⁺ art" is added at the end of each caption. Additionally, some embodiments procedurally generate 40 prompts to introduce object variations, where each prompt is of the form "A picture of <object> in the style of V$^+$ art" for BAM-FG models and "A painting of <object> in the style of V$^+$ art." 40 objects are selected from a collection of 50 obtained by ChatGPT using the prompt: "Provide 50 objects that can appear on a design, poster, or painting."

In some examples, more than 1M images from 7000 object-centric models and almost 3M images from more than 11,000 artistic style models are generated. These images are split into out-of-distribution test sets, by using different data sources and held-out prompts. Next, some embodiments evaluate different feature spaces and improve the feature spaces for attribution.

Synthesized images 610 is an example of, or includes aspects of, the corresponding element described with reference to FIG. 5. First text prompt 615 is an example of, or includes aspects of, the corresponding element described with reference to FIG. 5. Additional synthesized images 620 is an example of, or includes aspects of, the corresponding element described with reference to FIG. 5. Second text prompt 625 is an example of, or includes aspects of, the corresponding element described with reference to FIG. 5.

Figure 7:
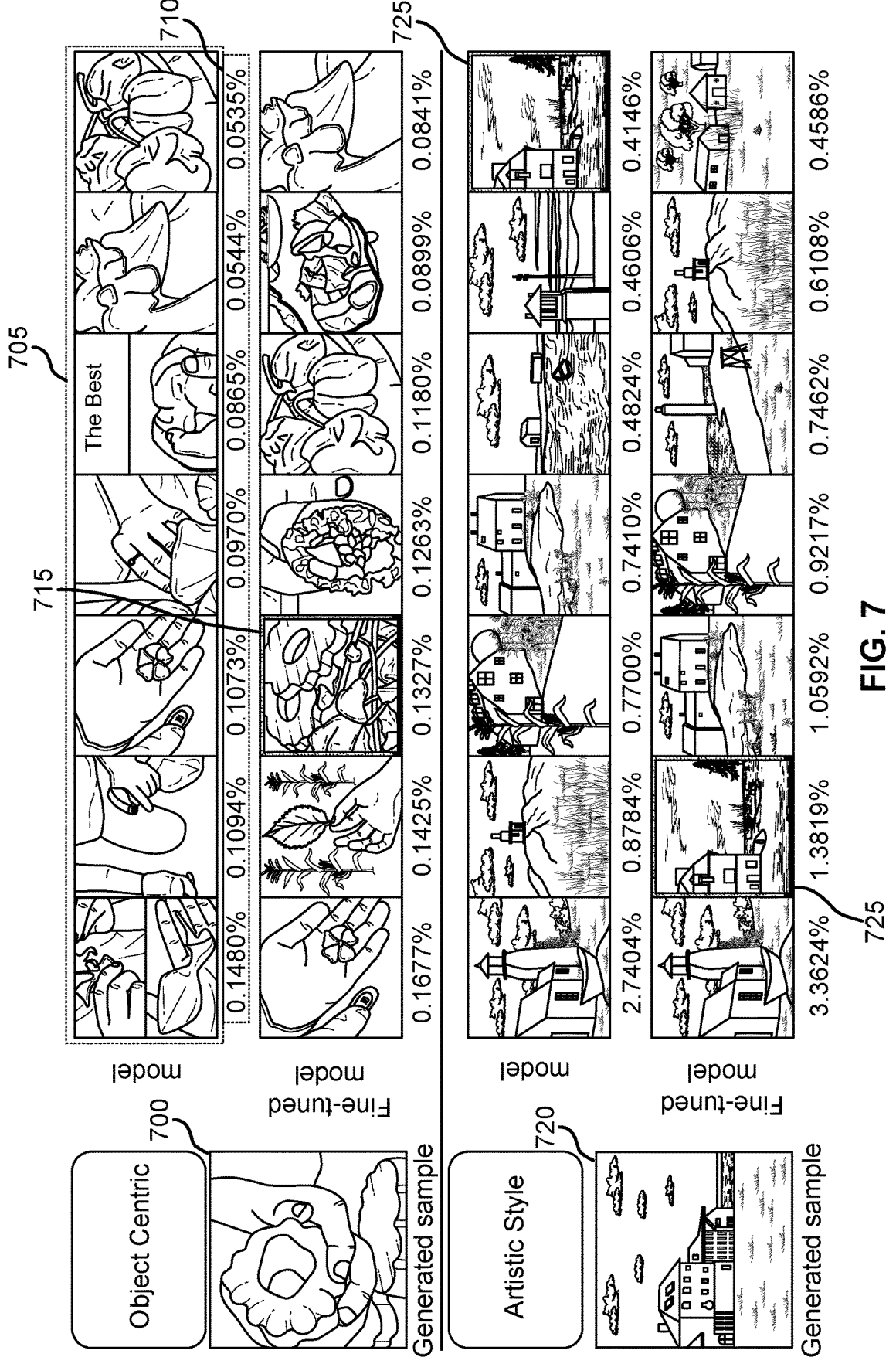
FIG. 7 shows an example of attribution scores computed for a set of images according to aspects of the present disclosure.

FIG. 7 shows an example of attribution scores 710 computed for a set of images according to aspects of the present disclosure. The example shown includes first synthesized sample 700, training images 705, attribution scores 710, first exemplar image 715, second synthesized sample 720, and second exemplar image 725.

For a given synthesized sample (e.g., first synthesized sample 700), obtained by training on an image of an acorn squash (top) and paintings by Alfred Sisley (bottom), the data processing apparatus, via fine-tuned attribution, improves the ranking and influence score of the exemplar training image (e.g., first exemplar image 715, second exemplar image 725).

Example experiments show that qualitative pre-trained DINO retrieval results (top two rows in FIG. 7) and CLIP retrieval results (bottom two rows in FIG. 7). DINO features attribute to visually similar images (e.g., hands with a yellow object), while CLIP retrieves semantically similar images (e.g., paintings).

At the Pareto frontier, the DINO model, already strong on object performance, is further strengthened when training on the object attribution dataset described in the present disclosure. The CLIP model is not on the Pareto frontier of pre-trained models, but increases its performance when a linear layer is trained on top with the custom attribution data described in the present disclosure, with all three variants on the frontier. This indicates that pre-trained CLIP features contain the potential for attribution, unlocked by the custom attribution dataset. An example in FIG. 7 demonstrates the improved retrieval performance for fine-tuned DINO (the second row) and CLIP attribution models (the fourth row), trained on both objects and artistic-style variants.

In some embodiments, the data processing apparatus computes the soft influence score (attribution scores 710). First exemplar image 715 is associated with an attribution score of 0.1327%. Second exemplar image 725 is associated with an attribution score of 0.4146% before fine-tuning. Second exemplar image 725 is associated with an attribution score of 1.3819% after fine-tuning.

The data processing apparatus computes influence scores for training images. In some cases, attribution scores 710 depend on calibrating the temperature of the softmax. Since the range of the cosine similarity is small ([−1, 1]), assigning influence scores with default temperature ($\tau=1$) leads to scores with insignificant variances (<0.0003% for training data). After calibration, related concepts obtain significantly higher influence scores.

Training images 705 is an example of, or includes aspects of, the corresponding element described with reference to FIGS. 4, 10, and 13. Attribution scores 710 is an example of, or includes aspects of, the corresponding element described with reference to FIG. 10.

FIG. 8 shows an example of a method 800 for data processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a synthesized image and a training image, where the synthesized image was generated by an image generation model that was trained with the training image. In some cases, the operations of this step refer to, or may be performed by, a machine learning model as described with reference to FIGS. 9, 10, and 13.

Synthesized images are unseen images and they are a reflection of the training dataset (e.g., training images). In text-to-image generative models, the training images contribute to the appearance of a synthesized image. Data attribution in text-to-image models relates to quantizing the influence that a training image has on generating a synthesized image. In some embodiments, a dataset of synthesized images paired with ground-truth exemplar images that influenced them are generated. This is referred to as an attribution dataset. Then the attribution dataset is used to evaluate candidate image retrieval feature spaces. In some examples, the attribution dataset improves feature spaces through a contrastive learning objective.

At operation 810, the system computes, using a machine learning model, first attribution features for the synthesized image using a first mapping layer of the machine learning model and second attribution features for the training image using a second mapping layer of the machine learning model that is different from the first mapping layer. In some cases, the operations of this step refer to, or may be performed by, a machine learning model as described with reference to FIGS. 9, 10, and 13.

In some embodiments, a machine learning model, trained via contrastive learning, learns a linear layer h, h̃ on top of an existing feature space $F_{base}$, using an attribution dataset. In some cases, h̃ and h are referred to as a first mapping layer and a second mapping layer, respectively. The embedding learns high similarity for corresponding training image and synthesize image, in contrast to non-corresponding images from the dataset.

At operation 815, the system generates an attribution score based on the first attribution features and the second attribution features, where the attribution score indicates a degree of influence for the training image on generating the synthesized image. In some cases, the operations of this step refer to, or may be performed by, an attribution component as described with reference to FIG. 9.

One or more embodiments of the present disclosure relates to systems and methods of evaluating data attribution (e.g., computing an attribution score). The attribution score indicates a degree of influence for the training image on generating the synthesized image. An image generation model (e.g., a large-scale generative model) is tuned toward a given exemplar object or style (e.g., an exemplar image containing the object or the style). As a result, the image generation model efficiently generates synthesized images that are computationally influenced by the exemplar image by construction. Accordingly, a dataset of such exemplar-synthesized image pairs is collected. Such a dataset is used to evaluate data attribution methods and different feature spaces.

In some examples, a positive sample pair includes an exemplar image used to train an image generation model and a synthesized image generated by the image generation model. In some examples, base models (e.g., DINO, CLIP, and ViT) are fine-tuned on the dataset of positive sample pairs toward the attribution task. The attribution component is configured to apportion influence scores over the training dataset including a set of training images by computing soft attribution scores over the set of training images.

Network Architecture

Figure 9:
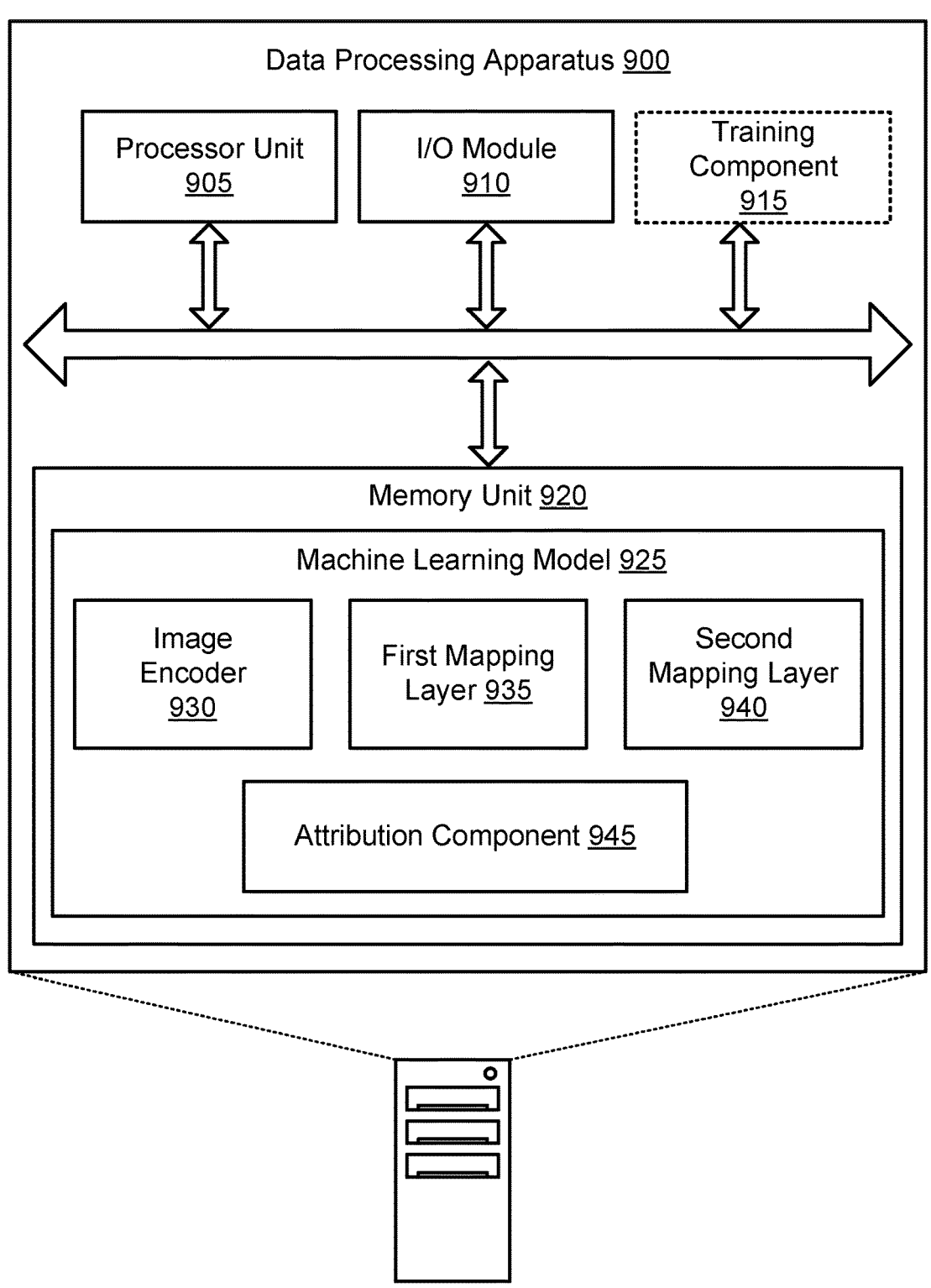
FIG. 9 shows an example of a data processing apparatus according to aspects of the present disclosure.
Figure 10:
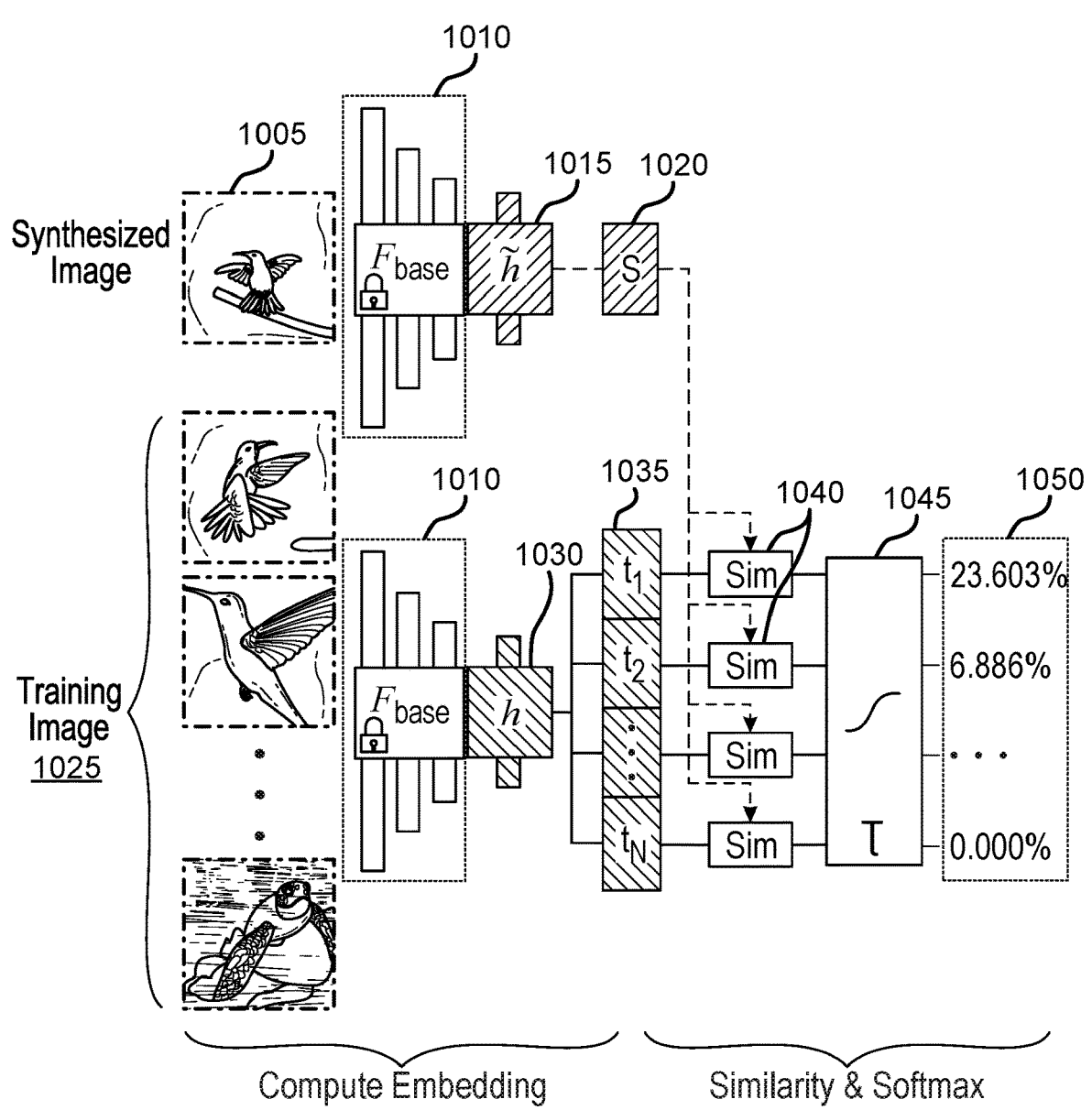
FIG. 10 shows an example of a machine learning model according to aspects of the present disclosure.

In FIGS. 9-10, an apparatus and method for data processing are described. One or more embodiments of the apparatus and method include at least one processor; at least one memory including instructions executable by the at least one processor; a machine learning model comprising parameters stored in the at least one memory, where the machine learning model comprises a first mapping layer configured to compute first attribution features for a synthesized image and a second mapping layer, different from the first mapping layer, configured to compute second attribution features for a training image; and an attribution component configured to generate an attribution score based on the first attribution features and the second attribution features, where the attribution score indicates a degree of influence for the training image on generating the synthesized image.

In some examples, the machine learning model further comprises an image encoder configured to generate first image features for the synthesized image and second image features for the training image, and where the first attribution features and the second attribution features are based on the first image features and the second image features, respectively.

In some examples, the image encoder is fixed during training of the first mapping layer and the second mapping layer. In some examples, the image encoder comprises a part of an image generation model used to generate the synthesized image. In some examples, the first mapping layer and the second mapping layer comprise linear layers.

Some examples of the apparatus and method further include a training component configured to receive training data including an exemplar image used to train an image generation model and the synthesized image generated by the image generation model and configured to train, using the training data, the first mapping layer and the second mapping layer to generate the first attribution features and the second attribution features, respectively.

FIG. 9 shows an example of a data processing apparatus 900 according to aspects of the present disclosure. The example shown includes data processing apparatus 900, processor unit 905, I/O module 910, training component 915, memory unit 920, and machine learning model 925. Data processing apparatus 900 is an example of, or includes aspects of, the corresponding element described with reference to FIG. 1.

Processor unit 905 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 905 is configured to operate a memory array using a memory controller. In other cases, a memory controller is integrated into the processor. In some cases, processor unit 905 is configured to execute computer-readable instructions stored in a memory to perform various functions. In some embodiments, processor unit 905 includes special purpose components for modem processing, baseband processing, digital signal processing, or transmission processing.

Examples of memory unit 920 include random access memory (RAM), read-only memory (ROM), or a hard disk. Examples of memory unit 920 include solid state memory and a hard disk drive. In some examples, memory unit 920 is used to store computer-readable, computer-executable software including instructions that, when executed, cause a processor to perform various functions described herein. In some cases, memory unit 920 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 920 store information in the form of a logical state.

In some examples, at least one memory unit 920 includes instructions executable by the at least one processor unit 905. Memory unit 920 includes machine learning model 925 or stores parameters of machine learning model 925.

I/O module 910 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 910 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, data processing apparatus 900 includes a computer implemented artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, data processing apparatus 900 includes a convolutional neural network (CNN) for image processing (e.g., image encoding, image decoding). CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 915 obtains training data including an exemplar image used to train an image generation model and a synthesized image generated by the image generation model. In some examples, training component 915 trains, using the training data, a first mapping layer 935 and a second mapping layer 940 of a machine learning model 925 to generate first attribution features and second attribution features, respectively. In some examples, the training data includes a set of image pairs from a set of different image generation models. In some examples, training component 915 fine-tunes the image generation model based on the exemplar image.

In some examples, training component 915 computes a normalized temperature cross-entropy loss. In some examples, training component 915 updates parameters of the machine learning model 925 based on the normalized temperature cross-entropy loss. In some examples, the training includes contrastive learning based on the exemplar image and the synthesized image.

According to some embodiments, training component 915 is configured to receive training data including an exemplar image used to train an image generation model and the synthesized image generated by the image generation model and configured to train, using the training data, the first mapping layer 935 and the second mapping layer 940 to generate the first attribution features and the second attribution features, respectively.

In some examples, at least one memory includes instructions executable by the at least one processor. The at least one memory stores parameters of machine learning model 925. Machine learning model 925 is an example of, or includes aspects of, the corresponding element described with reference to FIGS. 10 and 13. In one embodiment, machine learning model 925 includes image encoder 930, first mapping layer 935, second mapping layer 940, and attribution component 945.

According to some embodiments, machine learning model 925 identifies a synthesized image and a training image, where the synthesized image was generated by a machine learning model 925 that was trained with the training image. In some examples, machine learning model 925 computes first attribution features for the synthesized image using a first mapping layer 935 and second attribution features for the training image using a second mapping layer 940 different from the first mapping layer 935. In some examples, machine learning model 925 selects the training image from the set of training images based on the set of attribution scores.

In some examples, the first mapping layer 935 and the second mapping layer 940 represent different affine transformations. In some examples, the first mapping layer 935 and the second mapping layer 940 are trained using contrastive learning based on a positive sample pair including a first image used to train an image generation model and a second image generated by the image generation model.

In some examples, machine learning model 925 receives a query indicating the synthesized image. Machine learning model 925 retrieves the training image in response to the query based on the attribution score.

In some examples, the first mapping layer 935 and the second mapping layer 940 represent different affine transformations. First mapping layer 935 is an example of, or includes aspects of, the corresponding element described with reference to FIGS. 10 and 13. Second mapping layer 940 is an example of, or includes aspects of, the corresponding element described with reference to FIGS. 10 and 13.

According to some embodiments, machine learning model 925 includes parameters stored in the at least one memory. Machine learning model 925 comprises a first mapping layer 935 configured to compute first attribution features for a synthesized image and a second mapping layer 940, different from the first mapping layer 935, configured to compute second attribution features for a training image. In some examples, machine learning model 925 further includes image encoder 930 configured to generate first image features for the synthesized image and second image features for the training image, and where the first attribution features and the second attribution features are based on the first image features and the second image features, respectively. In some examples, the first mapping layer 935 and the second mapping layer 940 include linear layers.

According to some embodiments, image encoder 930 generates first image features for the synthesized image and second image features for the training image, where the first attribution features and the second attribution features are based on the first image features and the second image features, respectively. In some examples, the first image features and the second image features include object features, style features, or a combination thereof.

In some examples, image encoder 930 is pre-trained and fixed during training of the first mapping layer 935 and the second mapping layer 940. Image encoder 930 is an example of, or includes aspects of, the corresponding element described with reference to FIGS. 10 and 13. For example, image encoder 930 can be part of an image generation model. In some embodiments, the image generation model from which the image encoder 930 is taken may also be fine-tuned to generate training data for machine learning model 925. For example, first mapping layer 935 and second mapping layer 940 may be appended to image encoder 930, which is frozen while training first mapping layer 935 and second mapping layer 940.

According to some embodiments, attribution component 945 generates an attribution score based on the first attribution features and the second attribution features, where the attribution score indicates a degree of influence for the training image on generating the synthesized image. In some examples, attribution component 945 computes a vector similarity between the first attribution features and the second attribution features, where the attribution score is generated based on the vector similarity. In some examples, attribution component 945 computes a set of attribution scores for a set of training images, respectively. In some examples, the attribution component 945 includes a similarity function and a softmax function.

FIG. 10 shows an example of a machine learning model 1000 according to aspects of the present disclosure. The example shown includes machine learning model 1000, synthesized image 1005, image encoder 1010, first mapping layer 1015, first attribution features 1020, training images 1025, second mapping layer 1030, second attribution features 1035, similarity function 1040, softmax function 1045, and attribution scores 1050. Machine learning model 1000 is an example of, or includes aspects of, the corresponding element described with reference to FIGS. 9 and 13.

According to some embodiments, machine learning model 1000 at inference computes the similarity between the synthesized image and training images, using a base feature extractor and the learned embedding. The training procedure is illustrated in FIGS. 12-13 below. Taking a softmax with calibrated temperature t over similarities produces influence scores. Machine learning model 1000 converts and calibrates feature similarities to a percentage assignment via softmax $\hat{S}_\tau(x; \tilde{x}, \mathcal{X}) = \text{Softmax}(\{F(x)^T\tilde{F}(\tilde{x})/\tau\}_{x\in\chi})$, where x denotes a single training image, $\tilde{x}$ denotes a synthetic image, and $\mathcal{X}$ denotes a set of candidate training images.

Referring to FIG. 10, the softmax procedure is illustrated. The calibration optimizes the temperature $\tau$ to match the ground-truth attribution score $$S(x; \tilde{x}) = \frac{1}{|\mathcal{X}^+|}\mathbb{1}_{\{x\in\mathcal{X}^+\}},$$

where $\mathcal{X}_q^+$ denotes the corresponding set of training exemplars. In some cases, the attribution score is also referred to as an influence score.

In some examples, machine learning model 1000 includes image encoder 1010. Image encoder 1010 takes synthesized image 1005 as input and generates first image features for the synthesized image. First mapping layer 1015 takes first image features as input and generates first attribution features 1020. Image encoder 1010 is an example of, or includes aspects of, the corresponding element described with reference to FIGS. 9 and 13. First mapping layer 1015 is an example of, or includes aspects of, the corresponding element described with reference to FIGS. 9 and 13. First attribution features 1020 is an example of, or includes aspects of, the corresponding element described with reference to FIG. 13.

In some examples, image encoder 1010 takes a training image from the training images 1025 as input and generates second image features for the training image. Second mapping layer 1030 takes the second image features as input and generates second attribution features 1035. In some cases, h and h are used to denote first mapping layer 1015 and second mapping layer 1030, respectively. Second mapping layer 1030 is an example of, or includes aspects of, the corresponding element described with reference to FIGS. 9 and 13. Second attribution features 1035 is an example of, or includes aspects of, the corresponding element described with reference to FIG. 13.

According to an embodiment, an attribution component includes similarity function 1040 and softmax function

1045. The attribution component generates an attribution score 1050 based on the first attribution features 1020 and the second attribution features 1035. The attribution score 1050 indicates a degree of influence for the training image on generating the synthesized image 1005.

In some embodiments, the KL-divergences are optimized across queries in the training set jointly to obtain $\tau$. Denote the synthetic image query as $\tilde{x}_q$ and their corresponding exemplar training images as $\mathcal{X}_q^+$. The objective is formulated as follows:

$$\sum_{\tilde{x}_q}\mathcal{D}_{KL}[S(x; \tilde{x}_q)\|\hat{S}_\tau(x; \tilde{x}_q, \mathcal{X}_q^+ \cup \mathcal{X})] = \tag{1}$$

$$\sum_{\tilde{x}_q}\sum_{x\in\mathcal{X}_q^+\cup\mathcal{X}}\frac{1}{|\mathcal{X}_q^+|}\mathbb{1}_{\{x\in\mathcal{X}_q^+\}}\log\hat{S}_\tau(x; \tilde{x}_q, \mathcal{X}_q^+ \cup \mathcal{X}) =$$

$$\sum_{\tilde{x}_q}\sum_{x\in\mathcal{X}_q^+}\frac{1}{|\mathcal{X}_q^+|}\log\hat{S}_\tau(x; \tilde{x}_q, \mathcal{X}_q^+ \cup \mathcal{X})$$

In some embodiments, feature similarity with the ground truth is denoted as $d\equiv F(x)^T\tilde{F}(\tilde{x})$ to calculate softmax. Additionally, feature similarities between $\tilde{x}$ and $x\in\mathcal{X}^+\cup\mathcal{X}$ are computed and listed in descending order: $d_{(0)}\geq d_{(1)}\geq \ldots \geq d_{(M)}$. The log softmax term is formulated as follows:

$$\log\hat{S}_\tau(x; \tilde{x}, \mathcal{X}) = \frac{d}{\tau} - \log\sum_j\exp\left(\frac{d_{(j)}}{\tau}\right) \tag{2}$$

Synthesized image 1005 is an example of, or includes aspects of, the corresponding element described with reference to FIGS. 3, 4, and 13. Training images 1025 is an example of, or includes aspects of, the corresponding element described with reference to FIGS. 4, 7, and 13. Attribution scores 1050 is an example of, or includes aspects of, the corresponding element described with reference to FIG. 7.

FIG. 11 shows an example of a method 1100 for data processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates first image features for the synthesized image and second image features for the training image using an image encoder of the machine learning model, where the first attribution features and the second attribution features are based on the first image features and the second image features, respectively. In some cases, the operations of this step refer to, or may be performed by, an image encoder as described with reference to FIGS. 9, 10, and 13.

At operation 1110, the system computes a vector similarity between the first attribution features and the second attribution features, where the attribution score is generated based on the vector similarity. In some cases, the operations of this step refer to, or may be performed by, an attribution component as described with reference to FIG. 9.

At operation 1115, the system computes a set of attribution scores for a set of training images, respectively. In some cases, the operations of this step refer to, or may be performed by, an attribution component as described with reference to FIG. 9.

At operation 1120, the system selects the training image from the set of training images based on the set of attribution scores. In some cases, the operations of this step refer to, or may be performed by, a machine learning model as described with reference to FIGS. 9, 10, and 13.

Training and Evaluation

In FIGS. 12-13, a method, apparatus, and non-transitory computer readable medium for training a machine learning model are described. One or more embodiments of the method, apparatus, and non-transitory computer readable medium include obtaining training data including an exemplar image used to train an image generation model and a synthesized image generated by the image generation model and training, using the training data, a machine learning model to generate an attribution score for synthesized images by training a first mapping layer of the machine learning model to generate first attribution features for the synthesized images and training a second mapping layer of the machine learning model to generate second attribution features for candidate training images used to train the image generation model.

In some examples, the training data includes a plurality of image pairs from a plurality of different image generation models. Some examples of the method, apparatus, and non-transitory computer readable medium further include fine-tuning the image generation model based on the exemplar image. Some examples further include generating the synthesized image using the fine-tuned image generation model.

Some examples of the method, apparatus, and non-transitory computer readable medium further include computing a normalized temperature cross-entropy loss. Some examples further include updating parameters of the machine learning model based on the normalized temperature cross-entropy loss.

In some examples, the training comprises contrastive learning based on the exemplar image and the synthesized image. In some examples, the first mapping layer and the second mapping layer perform different affine transformations from each other.

FIG. 12 shows an example of a method 1200 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system obtains training data including an exemplar image used to train an image generation model and a synthesized image generated by the image generation model. In some cases, the operations of this step refer to, or may be performed by, a training component as described with reference to FIG. 9.

According to some embodiments of the present disclosure, data attribution for large-scale image generation models is defined, evaluated and learned. In some cases, an image generation model is also referred to as a generative model. Given a dataset $\mathcal{D}=\{(x,c)\}$, containing images $x \in \mathcal{X}$ and conditioning text c, the generative model training process involves training an image generation model $G:(z,c) \rightarrow x$, where $z \sim \mathcal{N}$ (0,I) and sampled image x is drawn from the distribution $p(x|c)$. Denote $\mathcal{X}$ as the original training set (e.g., LAION). Denote the training process as T: $\mathcal{D} \rightarrow G$.

In some embodiments, a dataset of N models is created. The custom dataset contains paired sets of exemplar training images $\mathcal{X}_i^+$ and influenced synthetic images $\tilde{\mathcal{X}}_i$, taking into account the generative modeling training process T. The data processing apparatus, via a training component, learns the inverse and predicts the corresponding influencing set $\mathcal{X}_i^+$ from a synthesized image $\tilde{x} \in \tilde{\mathcal{X}}_i$. In some cases, a synthesized image is also referred to as a generated image.

At operation 1210, the system trains, using the training data, a machine learning model to generate an attribution score for synthesized images by training a first mapping layer of the machine learning model to generate first attribution features for the synthesized images and training a second mapping layer of the machine learning model to generate second attribution features for candidate training images used to train the image generation model. In some cases, the operations of this step refer to, or may be performed by, a training component as described with reference to FIG. 9.

In some embodiments, the training process involves training an image generation model by adding a concept to the original training set. The added concept contains one or more exemplar images and one prompt $\mathcal{D}^+=\{(x^+, c^+)\}$. Output from the training process is a fine-tuned image generation model: $G^+=T(\mathcal{D} \cup \mathcal{D}^+)$.

In some embodiments, as training a new generator from scratch for each concept is costly, Custom Diffusion is used because it's an efficient fine-tuning method (e.g., 6 minutes) with low storage requirements (e.g., 75 MB). Custom Diffusion method enables efficient approximation in terms of runtime, memory, and storage and can scale up the collection of models and images in a tractable manner. One or more embodiments sample from the new generator as follows:

$$\tilde{x} = G^+(z, C(c^+)) \qquad (3)$$

where function C represents the prompt engineering process for generating a random text prompt related to the added concept $c^+$. Denote a dataset including exemplar images as $\mathcal{X}^+=\{x^+\}$ and the synthesized images set as $\tilde{\mathcal{X}}=\{\tilde{x}\}$.

In some embodiments, a frozen pre-trained image encoder $F_{base}$, with a second mapping layer h and a first mapping layer $\tilde{h}$ are applied to obtain image encoders $F=h \circ F_{base}$, $\tilde{F}=\tilde{h} \circ F_{base}$. For example, the pre-trained image encoder $F_{base}$ may be an encoder portion of an image generation model used to generate synthesized images as training data (e.g., the image generation model, G, or the fine-tuned image generation model, $G^+$).

At operation 1215, the system computes a normalized temperature cross-entropy loss. In some cases, the operations of this step refer to, or may be performed by, a training component as described with reference to FIG. 9.

In some embodiments, the training component computes a loss function such as an NT-Xent (normalized temperature cross-entropy) loss as follows:

$$\mathcal{L}_{cont}^{i} = -\left(\log\frac{\exp(t_i^T s_i/v)}{\sum_j \exp(t_i^T s_j/v)} + \log\frac{\exp(t_i^T s_i/v)}{\sum_j \exp(t_j^T s_i/v)}\right) \quad (4)$$

where $s_i = \tilde{F}(x)$ is attribution features extracted (e.g., normalized features) from the synthesized image, $t_i = F(x^+)$ is attribution features extracted from the training images, and $t_j$, $s_j$ are extracted attribution features from images in the dataset of N models. Here, negatives are drawn from other exemplar images $\cup_{j\neq i}\mathcal{X}_j^+$, rather than the original LAION dataset.

At operation 1220, the system updates parameters of the machine learning model based on the normalized temperature cross-entropy loss. In some cases, the operations of this step refer to, or may be performed by, a training component as described with reference to FIG. 9.

In some examples, the data curation process is a forward influence-generation process, generating synthesized images through the training process T. The data processing apparatus learns to reverse-first by training a feature extractor to retrieve $\mathcal{X}^+$ from $\tilde{x}$, then, by taking a calibrated softmax over the similarities. In some examples, this process uses Custom Diffusion as an approximation to the training process T, with an added image or group of images. Accordingly, the process can be used to assess an influence on the original generator $x=G(z,c)$. Some example experiments apply $\hat{S}_\tau$ and results are recorded.

FIG. 13 shows an example of training a machine learning model 1300 using contrastive learning according to aspects of the present disclosure. The example shown includes machine learning model 1300, synthesized image 1305, image encoder 1310, first mapping layer 1315, first attribution features 1320, training images 1325, second mapping layer 1330, and second attribution features 1335. Machine learning model 1300 is an example of, or includes aspects of, the corresponding element described with reference to FIGS. 9 and 10.

Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs.

In some embodiments, a dataset of N models is created. The custom dataset contains paired sets of exemplar training images $\mathcal{X}_i^+$ and influenced synthetic images $\tilde{\mathcal{X}}_i$, taking into account the generative modeling training process T. Some embodiments of the present disclosure learn the inverse and predict the corresponding influencing set $$\mathcal{X}_i^+$$

from a synthesized image $\tilde{z} \in \tilde{\mathcal{X}}_i$. In some cases, a synthesized image is also referred to as a generated image.

In some embodiments, an image encoder (e.g., a feature extractor) F places images $x^+$ with higher similarity to the synthesized image $\tilde{x}$ in $$\mathcal{X}_i^+,$$

as compared to the other random images $x^-$ in the original training dataset $\mathcal{X}$, which is the dataset used to pre-train the image generation model, e.g., LAION. The process of creating $$\mathcal{X}_i^+$$

is formulated as follow:

$$sim(F(x^+), F(\tilde{x})) > sim(F(x^-), F(\tilde{x})) \quad (5)$$

where $\tilde{x} \in \tilde{\mathcal{X}}_i$, $$x^+ \in \mathcal{X}_i^+$$

and $x^- \in \mathcal{X}$. $\mathcal{X}$ denotes the original training set (e.g., LAION).

In some embodiments, the custom dataset includes paired views of the training set and the synthesized set. This lends itself naturally to contrastive learning to capture the association between the two views.

Machine learning model 1300 can be trained using contrastive learning. In some embodiments, a frozen pre-trained image encoder $F_{base}$, with a second mapping layer h and a first mapping layer $\tilde{h}$ are combined to obtain image encoders $F=h\circ F_{base}$, $\tilde{F}=\tilde{h}\circ F_{base}$ of machine learning model 1300. A training component computes a loss such as an NT-Xent (normalized temperature cross-entropy) loss to train machine learning model 1300 (see FIG. 12 for details with regards to computing a normalized temperature cross-entropy loss).

In some embodiments, the training component incorporates regularization to train machine learning model 1300. Affine mapping functions are applied to generate attribution features. Denote the affine mappings as $H(x)=Wx+b$, and $\tilde{H}(x)=\tilde{W}x+\tilde{b}$ where $W$, $\tilde{W}$ are square matrices. In some embodiments, the mapping is regularized and added to formulate an attribution loss to avoid overfitting. The attribution loss function is formulated as follows:

$$\mathcal{L}_{attribution} = \mathbb{E}_i[\mathcal{L}_{cont}^i] + \lambda_{reg}\mathcal{L}_{reg} \quad (6)$$

$$\text{where } \mathcal{L}_{reg} = \frac{1}{2}\left(\left\|W^T W - I\right\|_F + \left\|\tilde{W}^T \tilde{W} - I\right\|_F\right)$$

where $\lambda_{reg}=0.05$ in some example experiments.

Accordingly, the training component learns a feature extractor, using the attribution dataset, for retrieval. An attribution component of machine learning model 1300 is configured to extract soft influence scores. The attribution component computes similarity scores through a softmax function to produce soft attribution scores (or influence scores). For example, for a synthesized image (e.g., a synthesized content query) $\tilde{x}$, the attribution component compares the query's feature similarities to images in a training dataset and computes scores by converting the similarities to percentage assignments via softmax. The attribution component computes scores as follows: $\hat{S}_\tau$ $(x;\tilde{x}, \mathcal{X})=\text{Softmax}(\{F(x)^T\tilde{F}(\tilde{x})/\tau\}_{x\in\chi})$.

In some embodiments, to tune this influence function predictor, for a synthetic image $\tilde{x} \in \tilde{\mathcal{X}}$, the ground truth influence is set to be shared within the small set $X^+$, defining $$S(x; \tilde{x}) = \frac{1}{|X^+|} \mathbb{1}_{\{x \in X^+\}}.$$

The training component calibrates the softmax temperature $\tau$ by minimizing the KL divergence between the reference credit scores and softmax values, averaged across the dataset as follows:

$$\underset{\tau}{\arg\min} \mathbb{E}_{\tilde{x}} \mathcal{D}_{KL}\left[S(x; \tilde{x}) \| \hat{S}_\tau\left(x; \tilde{x}, \left(\bigcup_i X_i^+\right) \cup X\right)\right] \quad (7)$$

In some examples, approximations are used to calculate softmax across the entire dataset to reduce memory consumption.

Synthesized image 1305 is an example of, or includes aspects of, the corresponding element described with reference to FIGS. 3, 4, and 10. Image encoder 1310 is an example of, or includes aspects of, the corresponding element described with reference to FIGS. 9 and 10. First mapping layer 1315 is an example of, or includes aspects of, the corresponding element described with reference to FIGS. 9 and 10. First attribution features 1320 is an example of, or includes aspects of, the corresponding element described with reference to FIG. 10. Training images 1325 is an example of, or includes aspects of, the corresponding element described with reference to FIGS. 4, 7, and 10. Second mapping layer 1330 is an example of, or includes aspects of, the corresponding element described with reference to FIGS. 9 and 10. Second attribution features 1335 is an example of, or includes aspects of, the corresponding element described with reference to FIG. 10.

Figure 14:
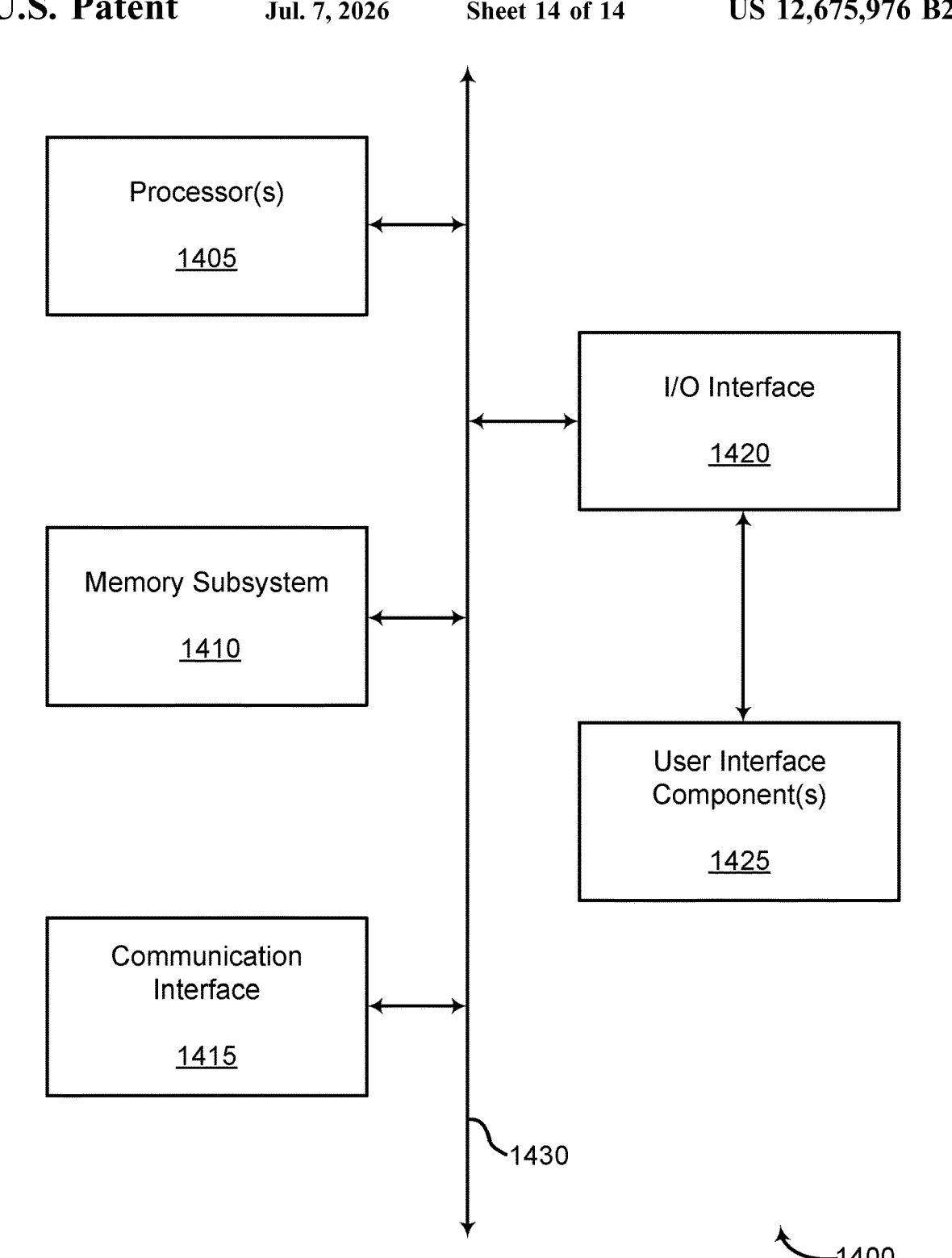
FIG. 14 shows an example of a computing device according to aspects of the present disclosure.

FIG. 14 shows an example of a computing device 1400 according to aspects of the present disclosure. The example shown includes computing device 1400, processor(s) 1405, memory subsystem 1410, communication interface 1415, I/O interface 1420, user interface component(s) 1425, and channel 1430.

In some embodiments, computing device 1400 is an example of, or includes aspects of, data processing apparatus 110 of FIG. 1. In some embodiments, computing device 1400 includes one or more processors 1405 that can execute instructions stored in memory subsystem 1410 to identify a synthesized image and a training image, where the synthesized image was generated by a machine learning model that was trained with the training image; compute first attribution features for the synthesized image using a first mapping layer and second attribution features for the training image using a second mapping layer different from the first mapping layer; and generate an attribution score based on the first attribution features and the second attribution features, where the attribution score indicates a degree of influence for the training image on generating the synthesized image.

According to some embodiments, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some embodiments, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1425 include a GUI.

Performance of apparatus, systems and methods of the present disclosure have been evaluated, and results indicate embodiments of the present disclosure have obtained increased performance over existing technology. Example experiments demonstrate that the data processing apparatus based on the present disclosure outperforms conventional systems.

In some examples, attribution methods described in the present disclosure are evaluated using two metrics: (1) Recall@K: proportion of influencers $\chi^+$ in top-K retrieved images, (2) mAP: a ranking-based score to evaluate the overall ordering of retrieval. To evaluate attribution methods efficiently, some examples retrieve from a union set of added concepts and a random subset of 1M images from LAION-400M. 8 test cases are prepared, each with 2 prompting schemes per split and 4 different test splits. These examples calculate the average metrics over queries for each test case and average the metric across test cases when reporting numbers for broader categories such as style-centric models.

In some embodiments, image encoders being tested include self-supervised (DINO, MoCo v3), language-pre-trained (CLIP), supervised (ViT), style descriptor (ALA-DIN), and copy detection (SSCD) methods. For DINO, MoCo, CLIP, and ViT, the same VIT-B/16 architecture is used for a fair comparison. The encoded features are evaluated with and without the learned linear mapping. Some embodiments train mappers with (1) object-centric models only, (2) style-centric models only, and (3) both.

With regards to what feature encoder to begin with, some example experiments have been conducted to illustrate which pre-trained features are suitable for data attribution. ImageNet-pretrained encoders (DINO, VIT, MoCo) perform better in object-centric models, and so do the features fine-tuned by the mapper based on the present disclosure. This indicates a smaller domain gap leads to better attribution of objects, since the models are also trained with ImageNet images.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

identifying a synthesized image and a training image, wherein the synthesized image was generated by an image generation model that was trained with the training image;

computing first attribution features based on the synthesized image using a first encoder and second attribution features based on the training image using a second encoder, wherein the first encoder includes a base encoder and a first mapping layer, and wherein the second encoder includes the base encoder and a second mapping layer that is different from the first mapping layer; and generating an attribution score by computing a vector similarity between the first attribution features and the second attribution features, wherein the attribution score indicates a degree of influence for the training image on generating the synthesized image.

2. The method of claim 1, wherein computing the first attribution features and the second attribution features comprises:

generating first image features for the synthesized image and second image features for the training image using the base encoder of a machine learning model, wherein the first attribution features and the second attribution features are based on the first image features and the second image features, respectively.

3. The method of claim 2, wherein:

the first image features and the second image features comprise object features, style features, or a combination thereof.

4. The method of claim 1, further comprising:

receiving a query indicating the synthesized image; and retrieving the training image in response to the query based on the attribution score.

5. The method of claim 1, further comprising:

computing a plurality of attribution scores for a plurality of training images, respectively; and selecting the training image from the plurality of training images based on the plurality of attribution scores.

6. The method of claim 1, wherein:

the first mapping layer and the second mapping layer represent different affine transformations.

7. The method of claim 1, wherein:

the first mapping layer and the second mapping layer are trained using contrastive learning based on a positive sample pair including a first image used to train the image generation model and a second image generated by the image generation model.

8. A method of training a machine learning model, the method comprising:

obtaining training data including an exemplar image used to train an image generation model and a synthesized image generated by the image generation model; and training, using the training data, a machine learning model to generate an attribution score for synthesized images by training a first mapping layer of a first encoder of the machine learning model to generate first attribution features for the synthesized images and training a second mapping layer of a second encoder of the machine learning model to generate second attribution features for candidate training images used to train the image generation model, wherein the first encoder includes a base encoder and the first mapping layer, and wherein the second encoder includes the base encoder and the second mapping layer.

9. The method of claim 8, wherein:

the first mapping layer and the second mapping layer perform different affine transformations from each other.

10. The method of claim 8, wherein:

the training data includes a plurality of image pairs from a plurality of different image generation models.

11. The method of claim 8, wherein obtaining the training data comprises:

fine-tuning the image generation model based on the exemplar image; and generating the synthesized image using the fine-tuned image generation model.

12. The method of claim 8, wherein training the machine learning model comprises:

computing a normalized temperature cross-entropy loss; and updating parameters of the machine learning model based on the normalized temperature cross-entropy loss.

13. The method of claim 8, wherein:

the training comprises contrastive learning based on the exemplar image and the synthesized image.

14. An apparatus comprising:

at least one processor; and at least one memory including instructions executable by the at least one processor to perform operations comprising:

identifying a synthesized image and a training image, wherein the synthesized image was generated by an image generation model that was trained with the training image;

computing first attribution features based on the synthesized image using a first encoder and second attribution features based on the training image using a second encoder, wherein the first encoder includes a base encoder and a first mapping layer, and wherein the second encoder includes the base encoder and a second mapping layer that is different from the first mapping layer; and generating an attribution score by computing a vector similarity between the first attribution features and the second attribution features, wherein the attribution score indicates a degree of influence for the training image on generating the synthesized image.

15. The apparatus of claim 14, further comprising:

a training component configured to receive training data including an exemplar image used to train the image generation model and the synthesized image generated by the image generation model and configured to train, using the training data, the first mapping layer and the second mapping layer to generate the first attribution features and the second attribution features, respectively.

16. The apparatus of claim 14, wherein:

the base encoder generates first image features for the synthesized image and second image features for the training image, and wherein the first attribution features and the second attribution features are based on the first image features and the second image features, respectively.

17. The apparatus of claim 16, wherein:

the base encoder is fixed during training of the first mapping layer and the second mapping layer.

18. The apparatus of claim 16, wherein:

the base encoder comprises a part of the image generation model used to generate the synthesized image.

19. The apparatus of claim 14, wherein:

the first mapping layer and the second mapping layer comprise linear layers.

\* \* \* \* \*